United States Patent
Greyson et al.

(10) Patent No.: US 10,744,894 B2
(45) Date of Patent: Aug. 18, 2020

(54) CHARGING SYSTEM FOR AN AUTONOMOUS MOBILE UNIT

(71) Applicant: Bastian Solutions, LLC, Indianapolis, IN (US)

(72) Inventors: Tiffany Lee Greyson, Boise, ID (US); Hans Tokpa Leidenfrost, Boise, ID (US); Jeremiah Scott Schroeder, American Falls, ID (US)

(73) Assignee: Bastian Solutions, LLC, Indianapolis, IN (US)

( * ) Notice: Subject to any disclaimer, the term of this patent is extended or adjusted under 35 U.S.C. 154(b) by 182 days.

(21) Appl. No.: 15/972,570

(22) Filed: May 7, 2018

(65) Prior Publication Data
US 2018/0319286 A1    Nov. 8, 2018

Related U.S. Application Data

(60) Provisional application No. 62/503,211, filed on May 8, 2017.

(51) Int. Cl.
*B60L 53/31* (2019.01)
*B60L 50/53* (2019.01)
(Continued)

(52) U.S. Cl.
CPC .............. *B60L 53/31* (2019.02); *B25J 5/007* (2013.01); *B25J 19/005* (2013.01); *B60L 5/38* (2013.01);
(Continued)

(58) Field of Classification Search
None
See application file for complete search history.

(56) References Cited

U.S. PATENT DOCUMENTS

| 3,340,821 A | * | 9/1967 | Wesener | B61B 13/00 104/88.06 |
| 5,484,091 A | | 1/1996 | Malinowski et al. | |

(Continued)

FOREIGN PATENT DOCUMENTS

| JP | H08-323676 A | 12/1996 |
| JP | 2014-151371 | 8/2014 |

(Continued)

OTHER PUBLICATIONS

U.S. Appl. No. 16/359,641, filed Mar. 20, 2019 to Bastian. 89 pages.
(Continued)

*Primary Examiner* — Jared Fureman
*Assistant Examiner* — Joel Barnett
(74) *Attorney, Agent, or Firm* — Woodard, Emhardt, Henry, Reeves & Wagner, LLP

(57) ABSTRACT

A material handling system includes storage rack configured to store one or more items. An Autonomous Mobile Unit (AMU) is configured to move within the storage rack to service the items. The storage rack includes at least one power rail to charge the AMU when within the storage rack. The AMU includes a wheel assembly with a cogwheel electrically connected to the power rail. The AMU includes a power supply electrically connected to the wheel assembly. The power supply includes a power converter electrically coupled to an Energy Storage System (ESS). The power rail includes a cog track with track teeth. The cogwheel includes cogwheel teeth intermeshed with the track teeth.

20 Claims, 14 Drawing Sheets

(51) Int. Cl.
- *B60L 53/14* (2019.01)
- *B25J 19/00* (2006.01)
- *B60L 5/38* (2006.01)
- *B25J 5/00* (2006.01)

(52) U.S. Cl.
CPC .............. *B60L 50/53* (2019.02); *B60L 53/14* (2019.02); *B60L 2200/00* (2013.01); *B60L 2200/26* (2013.01); *B60L 2200/44* (2013.01); *B60L 2220/46* (2013.01); *Y10S 901/23* (2013.01)

(56) References Cited

U.S. PATENT DOCUMENTS

| | | | |
|---|---|---|---|
| 6,652,213 | B1 | 11/2003 | Mitchell et al. |
| 8,403,614 | B2 | 3/2013 | Bastian, II et al. |
| 8,790,061 | B2 | 7/2014 | Yamashita |
| 9,122,566 | B2 | 9/2015 | Bastian, II et al. |
| 9,452,537 | B2 | 9/2016 | Nammoto et al. |
| 9,550,624 | B2 | 1/2017 | Khodl et al. |
| 2006/0072988 | A1 | 4/2006 | Hariki et al. |
| 2011/0290796 | A1 | 12/2011 | Burgess |
| 2014/0197652 | A1 | 7/2014 | Wang et al. |
| 2014/0277689 | A1* | 9/2014 | Salichs ................ B65G 1/1371 700/214 |
| 2015/0032252 | A1 | 1/2015 | Galluzzo et al. |
| 2015/0098775 | A1 | 4/2015 | Razumov |
| 2016/0089793 | A1 | 3/2016 | Truebenbach |
| 2016/0114482 | A1 | 4/2016 | Lessing et al. |
| 2016/0214808 | A1 | 7/2016 | Cyrulik et al. |
| 2016/0257240 | A1 | 9/2016 | High et al. |
| 2016/0346922 | A1* | 12/2016 | Shelton .................... B25J 9/162 |
| 2016/0355337 | A1* | 12/2016 | Lert ..................... B65G 1/0478 |
| 2017/0066592 | A1 | 3/2017 | Bastian, II et al. |
| 2017/0197316 | A1 | 7/2017 | Wagner et al. |
| 2017/0203443 | A1 | 7/2017 | Lessing et al. |
| 2017/0341221 | A1* | 11/2017 | Hashimoto ................ B25J 5/00 |

FOREIGN PATENT DOCUMENTS

| | | |
|---|---|---|
| KR | 10-2016-0133585 A | 11/2016 |
| KR | 10-2017-0037221 A | 4/2017 |

OTHER PUBLICATIONS

International Patent Application PCT/US2018/031378 Search Report dated Oct. 31, 2018. 4 pages.
International Patent Application PCT/US2018/031378 Written Opinion dated Oct. 31, 2018. 5 pages.
Bastian Solutions "Season's Greetings" Published Dec. 14, 2017. [retrieved Dec. 19, 2017]. pages. Retrieved from the Internet: <URL: https://www.youtube.com/watch?v=aVUmlled9fg.
Exotec Solutions "Skypod system, developed by Exotec Solutions." Published Dec. 7, 2017. [retrieved Dec. 18, 2017]. pages. Retrieved from the Internet: <URL: https://www.youtube.com/watch?v=uclGrc_Y-f4&sns=em>.
International Patent Application PCT/US2018/031378 International Preliminary Report on Patentability dated Nov. 21, 2019. 7 pages.

* cited by examiner

CHARGING SYSTEM FOR AN AUTONOMOUS MOBILE UNIT

CROSS-REFERENCE TO RELATED APPLICATION

This application claims the benefit of U.S. Provisional Patent Application No. 62/503,211, filed on May 8, 2017, which is hereby incorporated by reference.

BACKGROUND

Autonomous Mobile Units ("AMUs") are currently being used in industry to move goods through warehouse systems. Typically, AMUs are electrical, using electric motors connected to wheels to traverse a warehouse environment. Batteries, such as lithium ion batteries, are often included in the AMU and are used to store power that can drive the electric motors. Batteries have power storage limitations and require regular charging. Typically the charge time is long, taking an AMU offline for a substantial amount of time. Due to the relatively long charge time, a charging area is typically located away from the workspace of the AMU so the AMU does not interfere with the operation of other portions of a larger system while the AMU charges.

Thus, there is a need for improvement in this field.

SUMMARY

A unique charging system has been developed for charging AMUs. During development of this system, it was found that there is a need for a faster charging solution, that does not require dedicated space, and that allows AMUs to remain productive for substantially all the time that the AMUs are activated. The AMU system includes one or more power rails that are able to charge the AMU while in use. In one example, the power rails are incorporated into a storage rack where the AMUs travel to load, unload, and/or otherwise service items stored in the storage rack. The power rails can be located throughout the storage rack or at dedicated locations within the storage rack. Each AMU includes a wheel assembly with a cogwheel that is used to move the AMU within the storage rack. Teeth of the cogwheels intermesh with track teeth on the power rails to not only provide traction but also to ensure a strong electrical connection between the AMUs and the power rails. The AMU forms a circuit with the power rails that allows a charge storage device, such as a battery and/or capacitor, with the AMU to be charged on a continuous or near continuous basis. As should be recognized, the AMU charging system provides a fast charge solution that requires no dedicated charging space and that keeps the AMUs active for substantially all the time in which the AMUs are used.

Aspect 1 generally concerns a system that includes a storage rack with a power rail for charging an Autonomous Mobile Unit (AMU).

Aspect 2 generally concerns the system of aspect 1 in which the AMU includes a wheel assembly with a cogwheel electrically connected to the power rail.

Aspect 3 generally concerns the system of aspect 2 in which the AMU includes a power supply electrically connected to the wheel assembly.

Aspect 4 generally concerns the system of aspect 3 in which the power supply includes a power converter electrically coupled to an Energy Storage System (ESS).

Aspect 5 generally concerns the system of aspect 4 in which the power converter includes a rectifier configured to convert Alternating Current (AC) to Direct Current (DC).

Aspect 6 generally concerns the system of aspect 5 in which the power converter includes an inverter configured to convert DC to AC.

Aspect 7 generally concerns the system of aspect 6 in which the ESS includes a battery.

Aspect 8 generally concerns the system of aspect 3 in which the power rail includes a cog track with teeth intermeshed with teeth of the cogwheel.

Aspect 9 generally concerns the system of aspect 8 in which the wheel assembly includes a drive wheel configured to move the AMU outside of the storage rack.

Aspect 10 generally concerns the system of aspect 9 in which the drive wheel has a larger diameter than the cogwheel.

Aspect 11 generally concerns the system of aspect 9 in which the drive wheel electrically connects the cogwheel to the power supply.

Aspect 12 generally concerns the system of aspect 11 in which the wheel assembly includes a shaft that electrically connects the cogwheel to the power supply.

Aspect 13 generally concerns the system of aspect 12 in which the wheel assembly includes a gear box that electrically connects the cogwheel to the power supply.

Aspect 14 generally concerns the system of aspect 13 in which the wheel assembly includes a motor that electrically connects the cogwheel to the power supply.

Aspect 15 generally concerns the system of aspect 9 in which the wheel assembly includes a steering collar that electrically connects the cogwheel to the power supply.

Aspect 16 generally concerns the system of aspect 1 in which the AMU includes a shuttle that has a robotic arm.

Aspect 17 generally concerns the system of any previous aspect in which the AMU includes a wheel assembly with a cogwheel electrically connected to the power rail.

Aspect 18 generally concerns the system of any previous aspect in which the AMU includes a power supply electrically connected to the wheel assembly.

Aspect 19 generally concerns the system of any previous aspect in which the power supply includes a power converter electrically coupled to an Energy Storage System (ESS).

Aspect 20 generally concerns the system of any previous aspect in which the power converter includes a rectifier configured to convert Alternating Current (AC) to Direct Current (DC).

Aspect 21 generally concerns the system of any previous aspect in which the power converter includes an inverter configured to convert DC to AC.

Aspect 22 generally concerns the system of any previous aspect in which the ESS includes a battery.

Aspect 23 generally concerns the system of any previous aspect in which the power rail includes a cog track with teeth intermeshed with teeth of the cogwheel.

Aspect 24 generally concerns the system of any previous aspect in which the wheel assembly includes a drive wheel configured to move the AMU outside of the storage rack.

Aspect 25 generally concerns the system of any previous aspect in which the drive wheel has a larger diameter than the cogwheel.

Aspect 26 generally concerns the system of any previous aspect in which the drive wheel electrically connects the cogwheel to the power supply.

Aspect 27 generally concerns the system of any previous aspect in which the wheel assembly includes a shaft that electrically connects the cogwheel to the power supply.

Aspect 28 generally concerns the system of any previous aspect in which the wheel assembly includes a gear box that electrically connects the cogwheel to the power supply.

Aspect 29 generally concerns the system of any previous aspect in which the wheel assembly includes a motor that electrically connects the cogwheel to the power supply.

Aspect 30 generally concerns the system of any previous aspect in which the wheel assembly includes a steering collar that electrically connects the cogwheel to the power supply.

Aspect 31 generally concerns the system of any previous aspect in which the AMU includes a shuttle that has a robotic arm.

Aspect 32 generally concerns a method of operating the system of any previous aspect.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
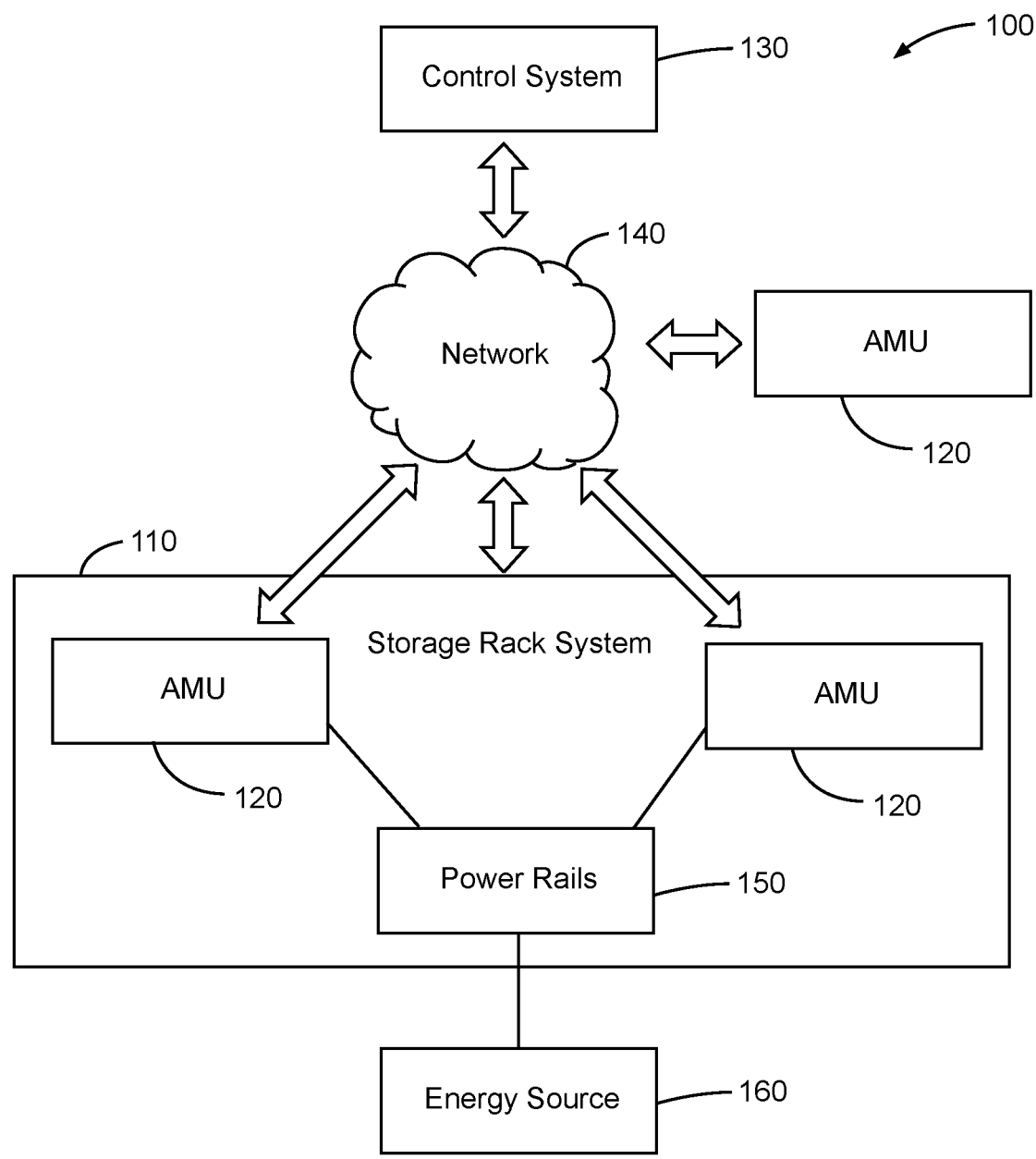
FIG. 1 is a diagrammatic view of an AMU system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

An Autonomous Mobile Unit System ("AMU system") 100 will now be described with reference to FIG. 1. As shown, the AMU system 100 includes a storage rack system 110, one or more Autonomous Mobile Units ("AMUs") 120, and a control system 130 that are operatively connected to one another through a network 140. The control system 130 assists in controlling the operation of the storage rack system 110 and the AMUs 120. In addition, the control system 130 collects data provided by the AMUs 120 and the storage rack system 110. The AMUs 120 are configured to operate autonomously and/or semi-autonomously relative to one another so as to store and retrieve items stored in the storage rack system 110. Within the storage rack system 110, the AMU system 100 has one or more power rails 150. An energy source 160 supplies electrical power to the power rails 150, and the power rails 150 are used to charge the AMUs 120.

Figure 2:
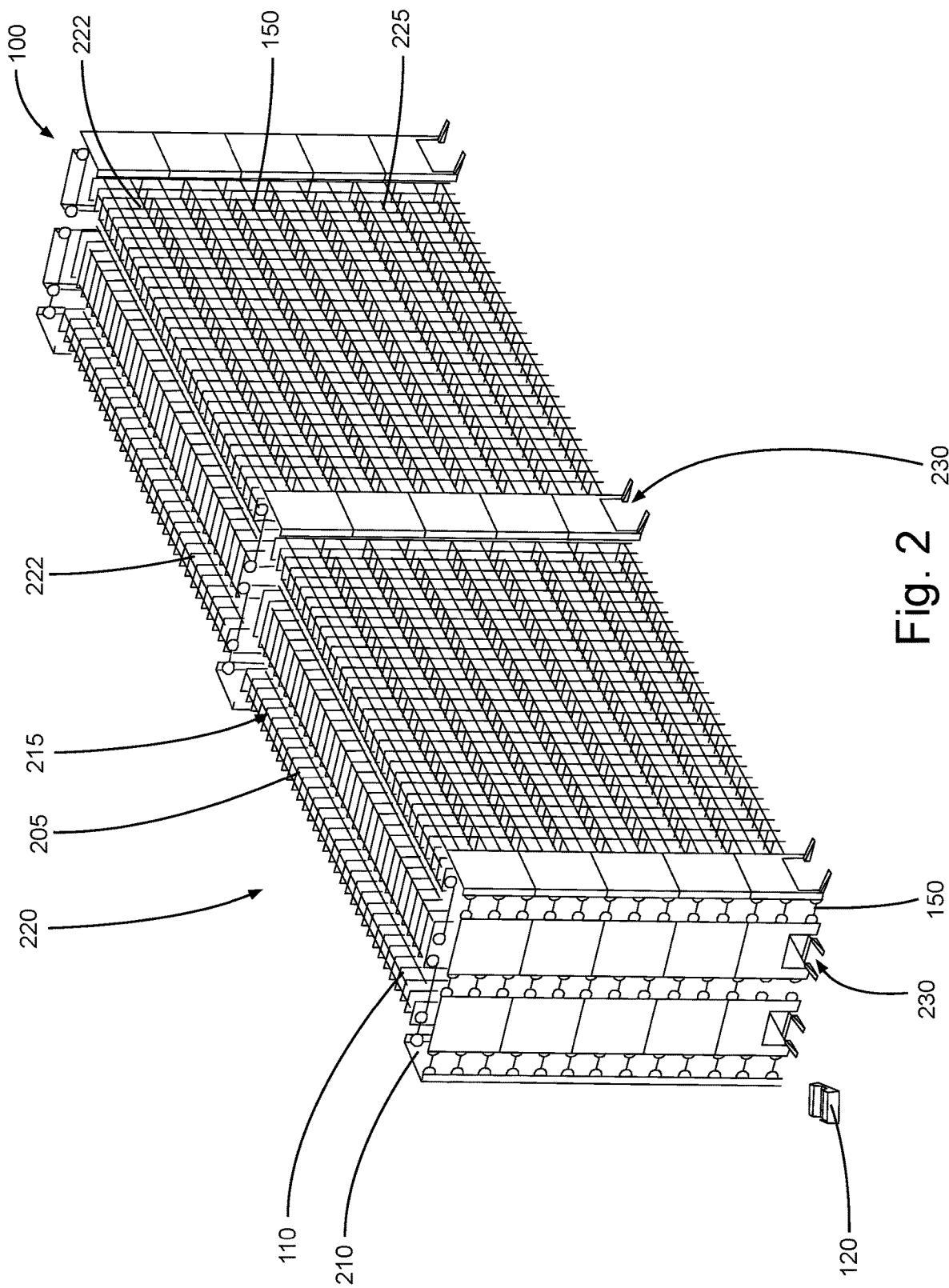
FIG. 2 is a perspective view of the FIG. 1 AMU system.

Turning to FIG. 2, the storage rack system 110 includes one or more storage racks 205 on which items are stored, and an AMU frame 210 on which the AMUs 120 are able to travel along the storage rack 205. As shown, the storage rack 205 include a series of storage rows 215 in which items are stored. The storage rows 215 of the storage rack 205 extends horizontally to form a series of rack columns 220 with rack ends 222. In the illustrated example, the storage rack 205 extend vertically to form one or more rack levels 225. In other examples, the storage rack 205 can be configured differently such as having fewer or more storage rows 215, rack columns 220, and/or rack levels 225.

The AMU frame 210 allows the AMUs 120 to travel along the storage rack 205 and service the various storage rows 215, rack columns 220, and rack levels 225. The AMU frame 210 includes one or more rack access passages 230 through which the AMUs 120 are able to enter or exit the storage rack system 110. The AMUs 120 are able to independently move along the floor outside of the storage rack system 110 so as to transfer items between various external service locations and the storage rack system 110.

Figure 3:
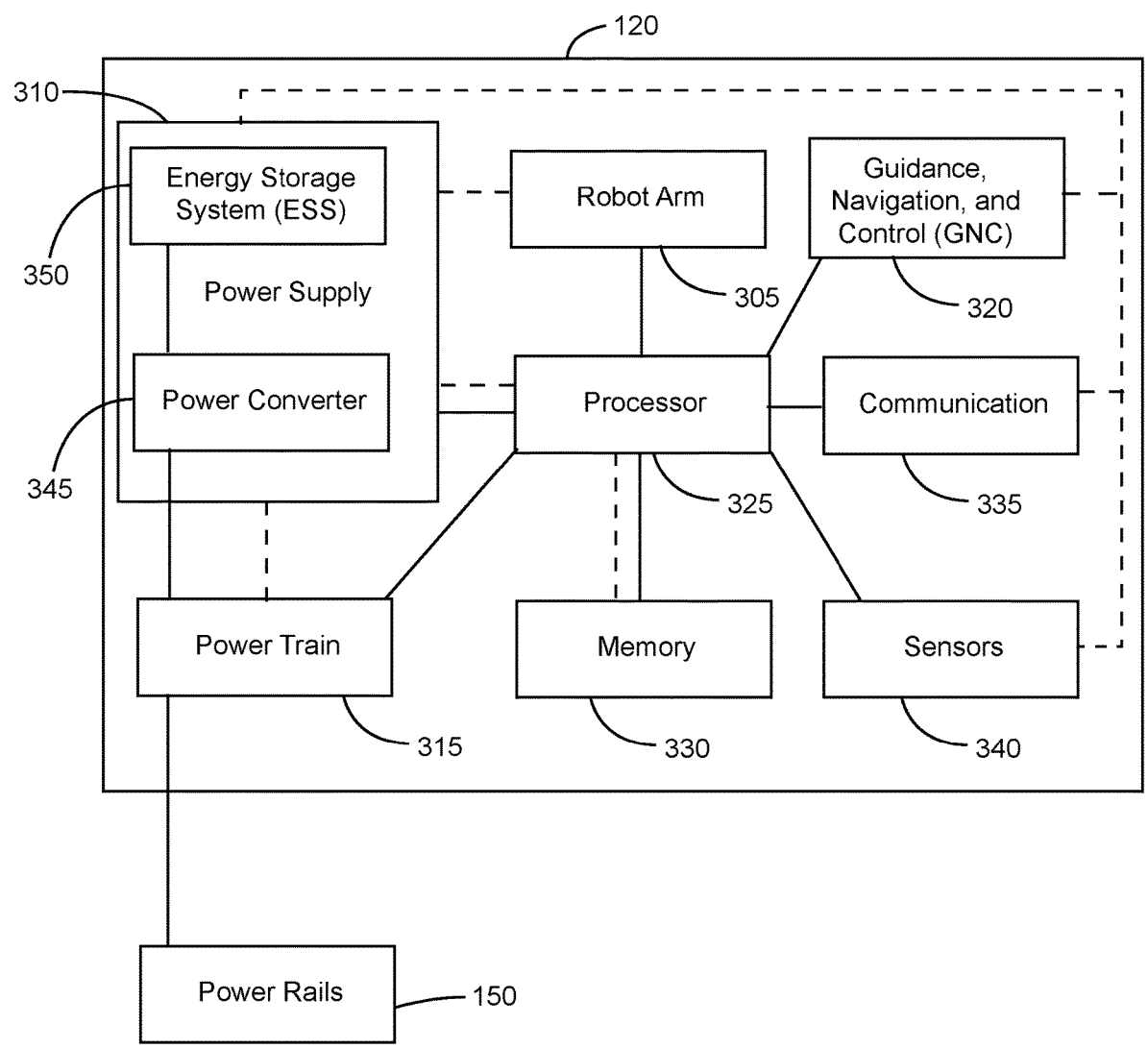
FIG. 3 is a diagrammatic view of an AMU used in the FIG. 1 AMU system.

FIG. 3 shows a diagrammatic view of the AMU 120. While FIG. 3 illustrates the components as being distinct from one another, it should be recognized that one or more of these components can be combined together to form an integral unit and/or selected components may be further subdivided and their function spread across multiple devices. As shown, the AMU 120 includes a robot arm 305, a power supply 310, a power train 315, and a Guidance, Navigation, and Control system ("GNC system") 320. The robot arm 305 is configured to pick or place items from various containers such as trays or totes located on the AMUs 120. The power supply 310 is configured to provide power to the AMU 120. The power train 315 is configured to move the AMU 120 inside and outside of the storage rack system 110. A GNC system 320 controls the movement and directs the travel path of the AMUs 120.

The AMU 120 further includes a processor 325, memory 330, a communication system 335, and one or more sensors 340. The power supply 310 includes a power converter 345 and an ESS 350 connected to the power converter 345. The power converter 345 in one version conditions the electrical current supplied to the ESS 350. In one particular example, the power converter 345 includes an inverter that converts alternating current (AC) electricity from the power rails 150 to direct current (DC) electricity that is supplied to ESS 350. The ESS 350, such as a battery and/or super capacitor, provides energy to the various components of the AMUs 120, as is indicated by the dashed line in FIG. 3. As shown, the processor 325 communicates with and controls the various components of the AMUs 120, and the memory 330 is used to store information from the processor 325 that concerns the AMUs 120, storage rack system 110, and/or other information. The communication system 335 is configured to communicate with the control system 130 and/or other AMUs 120 through the network 140. The communication system 335 in one example includes a radio transceiver, but in other variations, the communication system 335 can communicate in other ways. The sensors 340 are configured to sense the environment surrounding the AMU 120 as well as internal functions or parameters within the AMU 120. For example, the sensor 340 can include vision systems, light curtains, proximity sensors, thermocouples, and/or other types of sensors. In the illustrated example, the robot arm 305, the power supply 310, the power train 315, the GNC system 320, the power supply 310, memory 330, the communication system 335, and sensor 340 are operatively connected to the processor 325. It should be recognized that these components of the AMU 120 can be connected in other manners. For instance certain components can be alternatively or additionally operatively connected to one another such that the components can directly communicate with one another without the processor 325. Moreover, the various components of the AMU 120 can be powered in other manners than is illustrated.

Figure 4:
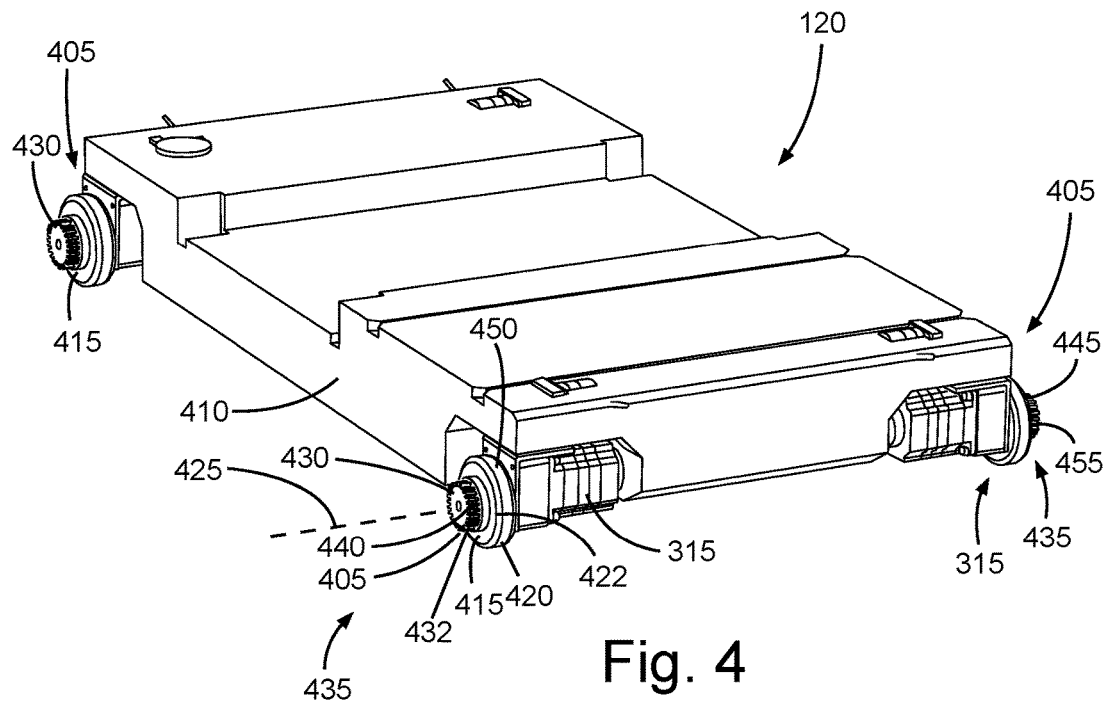
FIG. 4 is a perspective view of the FIG. 3 AMU.

FIG. 4 shows one example of the AMU 120 with one or more wheel assemblies 405 and a body 410. The AMU 120 includes the power converter 345 (or charging circuit) and the ESS 350 as well as the other components identified in FIG. 3. The wheel assemblies 405 are connected to the body 410. The power converter 345 and ESS 350 are mechanically connected to and carried by the body 410, such as within the body 410.

Though the AMU 120 shown in FIG. 4 has four (4) wheel assemblies 405 connected to the body 410 near the four (4) corners of the body 410, other arrangements are conceived. For example, the AMU 120 may include three (3) wheel assemblies 405 in a triangular configuration or four (4) wheel assemblies 405 in an offset configuration. Alternatively, the AMU 120 may have more than four (4) wheel assemblies 405, such as six (6) wheel assemblies 405 with two (2) additional wheel assemblies 405 positioned in between the four (4) wheel assemblies 405 shown, or eight (8) wheel assemblies 405 with four (4) wheel assemblies 405 positioned in parallel with one direction and four (4) wheel assemblies 405 in parallel with a perpendicular direction. Other variations are of course possible.

Each wheel assembly 405 includes a drive wheel 415 with a hub 422 and an outer traction portion 420, such as a tire. The hub 422 and outer traction portion 420 are positioned to share an axis 425. Additionally, each wheel assembly 405 further includes a cogwheel 430 that is mechanically connected to the hub 422, positioned concentrically with the axis 425 of the hub 422, and extending away from the hub 422 along the direction of the axis 425. In the example shown, the cogwheels 430 extends away from the wheel assembly 405 and the body 410. A cogwheel 430 extending in from the wheel assembly 405 toward the body 410 is also conceived. In each wheel assembly 405, the drive wheel 415 has an outer diameter that is larger than the outer diameter of the corresponding cogwheel 430 so that the drive wheels 415 are able to move the AMUs 120 outside of the storage rack system 110.

Referring again to FIG. 3, the power converter 345 is electrically connected to the ESS 350. In one example, the ESS 350 includes at least one capacitive device, such as a super capacitor. The ESS 350 may also include a chemical battery, such as a lithium ion battery. The power converter 345 is also electrically connected to at least one charge cogwheel 435 of the wheel assemblies 405. In the illustrated example, the charge cogwheels 435 include a first charge cogwheel 440 and at least one additional charge cogwheel 435 in the form of a second charge cogwheel 445. In the depicted example, the first charge cogwheel 440 is incorporated into a first wheel assembly 450, and the second charge cogwheel 445 is incorporated into a second wheel assembly 455. The first wheel assembly 450 and the second wheel assembly 455 in the illustrated example form an electric circuit for charging the ESS 350. Other wheel assemblies 405 in the AMU 120 can be used to simply move the AMU 120 and are not used to form a circuit for charging the ESS 350. In one form, at least the first charge cogwheel 440 of the first wheel assembly 450 and the second charge cogwheel 445 of the second wheel assembly 455 are electrically connected to the power converter 345. In the illustrated example, the second charge cogwheel 445 is positioned on the opposite side of the body 410 from the first charge cogwheel 440. For example, both the first charge cogwheel 440 and the second charge cogwheel 445 may be located in the front of the AMU 120. Alternatively, the first charge cogwheel 440 may be located near the front right, while the second charge cogwheel 445 may be located near the rear left. It is envisioned that other orientations of the charge cogwheels 435 are possible.

Figure 5:
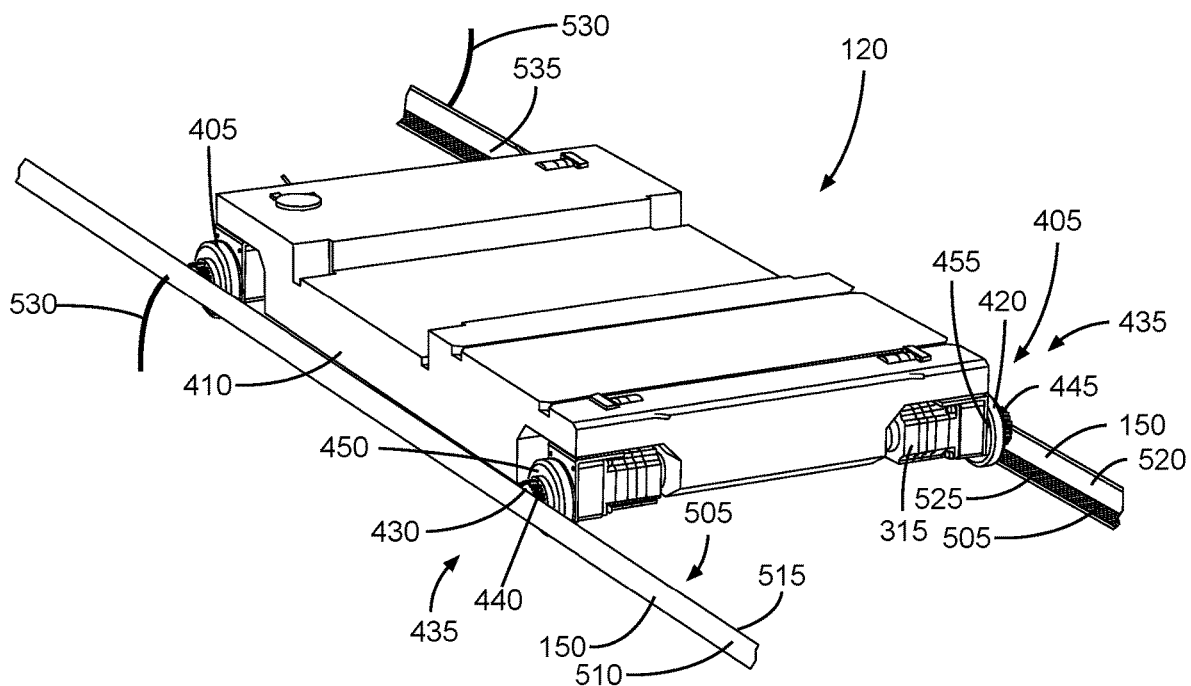
FIG. 5 is a perspective view of the FIG. 3 AMU riding on power rails in the FIG. 1 AMU system.

FIG. 5 shows the AMU 120 shown in FIG. 4 with a structure. In one example, the structure includes a section having the power rails 150 of the storage rack system 110. As noted before, the storage rack system 110 in one version includes the power rails 150 that are used to charge the AMU 120 when travelling within the storage rack system 110. The power rails 150 can be incorporated throughout the storage rack system 110 in one example such that the AMU 120 is always able to be continuously charged and/or powered when travelling on the AMU frame 210, or only certain parts of the storage rack system 110 in other examples have the power rails 150 so as to create recharging locations for the AMUs 120 within the storage rack system 110. Alternatively or additionally, all or some of the power rails 150 can be located outside of the storage rack system 110 or in other structures. The power rails 150 in one form include one or more charge cog tracks 505 on which the charge cogwheels 435 travel. In the illustrated example, the power rails 150 include a first side 510 with a first charge cog track 515, and a second side 520 with a second charge cog track 525. Each charge cog track 505 includes track teeth 535 configured to mesh with the cogwheel teeth 432 of the cogwheels 430 on the wheel assemblies 405. As shown in FIG. 5, the AMU 120 spans the power rails 150, with the cogwheels 430 of the wheel assemblies 405 meshing with each charge cog track 505. Each charge cog track 505 further includes an electrical charge connection 530 that electrically connects the power rails 150 to the energy source 160 in the manner depicted in FIG. 1. For example, the first charge cog track 515 may connect with a positive direct current (DC) voltage and the first charge cog track 515 may connect to a ground or negative DC voltage source incorporated into the energy source 160. The energy source 160 in other variations includes an alternating current (AC) system in which each charge cog track 505 is connected to opposite legs of the AC system (or ground).

In operation, the AMU 120 traverses the power rails 150 with the cogwheel teeth 432 of the cogwheels 430 meshing with the track teeth 535 of the charge cog tracks 505. When the cogwheels 430 are in contact with the charge cog tracks 505, the first charge cogwheel 440 is in electrical connection with the first charge cog track 515 and the second charge cogwheel 445 is in electrical connection with the second charge cog track 525. When the electrical charge connections 530 of the first charge cog track 515 and the second charge cog track 525 are active, the charging circuit is electrically connected to the electrical charge connection 530 through the first charge cogwheel 440 and the second charge cogwheel 445. As such, charge may flow from the energy source 160 via the electrical charge connection 530, through the charge cogwheels 435, through the power converter 345, and into the ESS 350. Thus, the AMU 120 is able to be charged while traversing the power rails 150.

Figure 6:
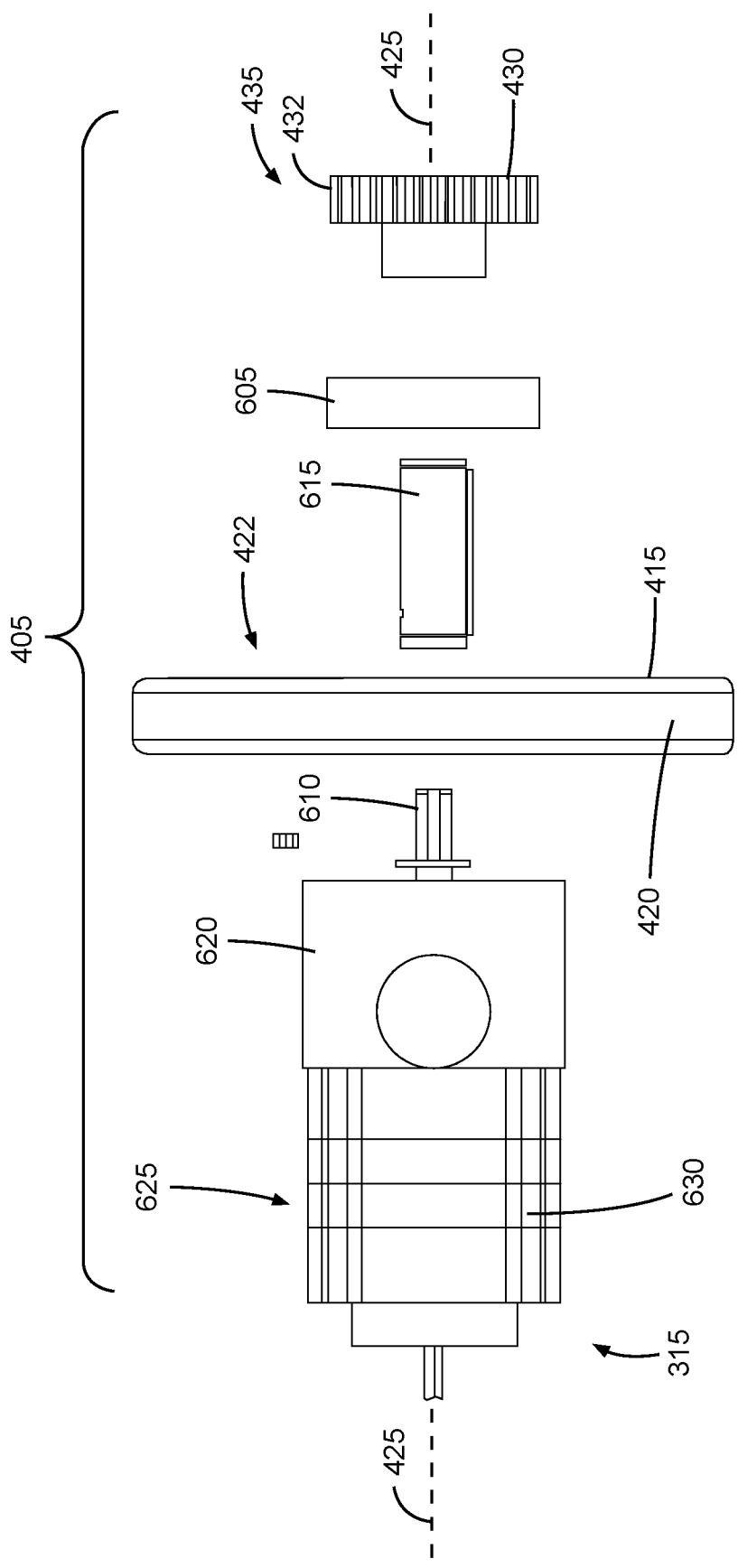
FIG. 6 is a top exploded view of a wheel assembly in the FIG. 3 AMU.
Figure 7:
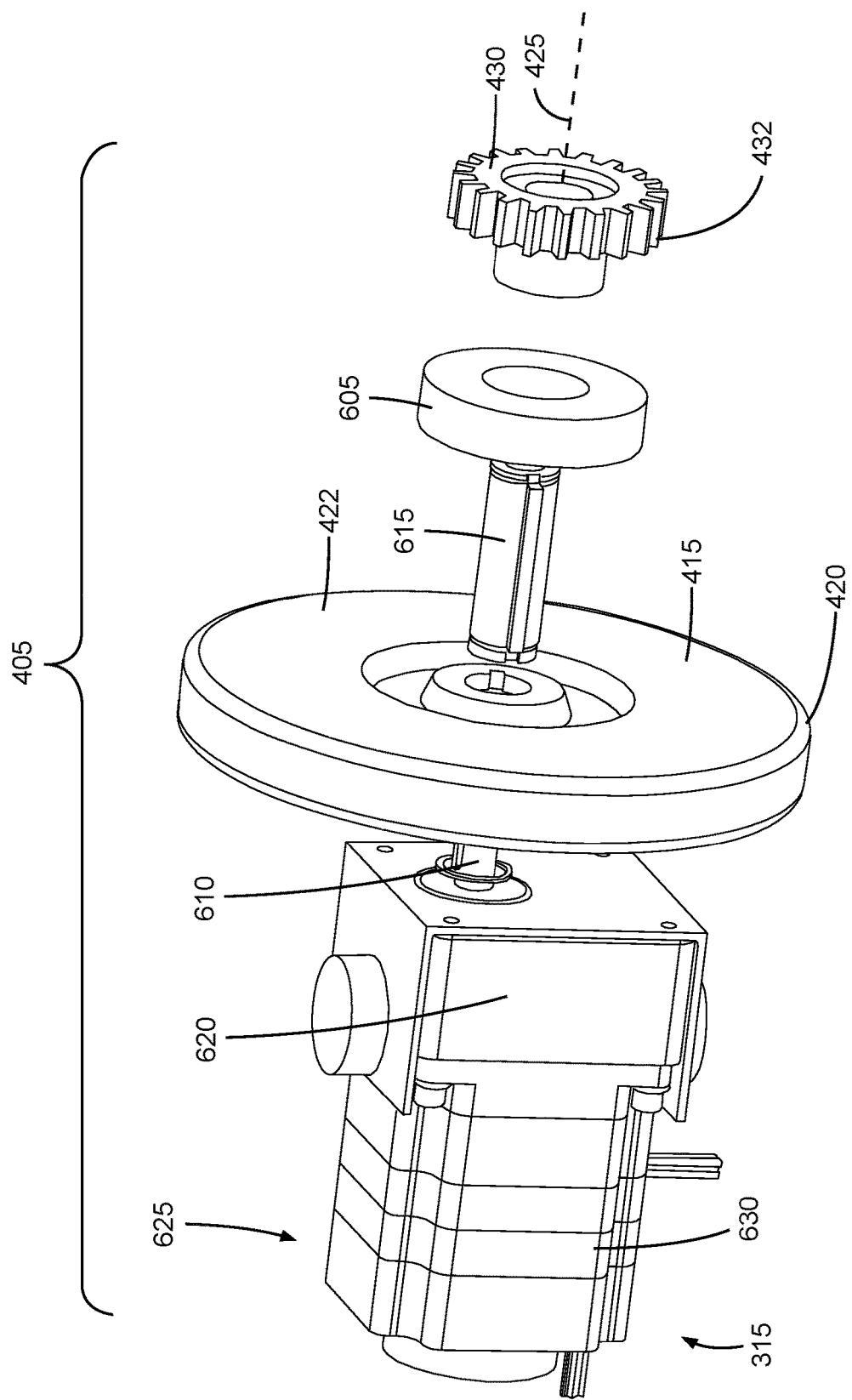
FIG. 7 is a top exploded view of the FIG. 6 wheel assembly.

FIGS. 6 and 7 show a top exploded view and a perspective exploded view, respectively, of the wheel assembly 405 that is used with the AMU 120. The wheel assembly 405 includes the cogwheels 430, a bearing 605, a shaft 610, the drive wheel 415 having the hub 422 along with the outer traction portion 420, an axle 615, a gearbox 620, and a motor 625. In the illustrated example, the motor 625 includes an electric motor 630 that is directly powered via electricity by the power supply 310. In other examples, other types of motors 625 can be used, and the power supply 310 can directly or indirectly power the motor 625. For instance, when used with a pneumatic type system, the electrical energy in the ESS 350 is converted to pneumatic power that powers the motor 625 which is in the form of a pneumatic drive. Alternatively or additionally, the ESS 350 can be in the form of a pressurized tank that pneumatically powers the motor 625 in a direct manner. Returning to the illustrated example, the electric motor 630 forms at least part of the power train 315 for the AMU 120. When provided power, the electric motor 630 provides a rotational force to the gearbox 620, which rotates the axle 615, shaft 610, hub 422, bearing 605, and cogwheels 430. The wheel assembly 405 in one form is rotatably connected to the body 410 of the AMU 120. For example, the two front wheel assemblies 405 may be rotatably connected to the AMU 120 to provide steering. Alternatively, the wheel assembly 405 may be connected to the AMU 120 in a fixed orientation.

Figure 8:
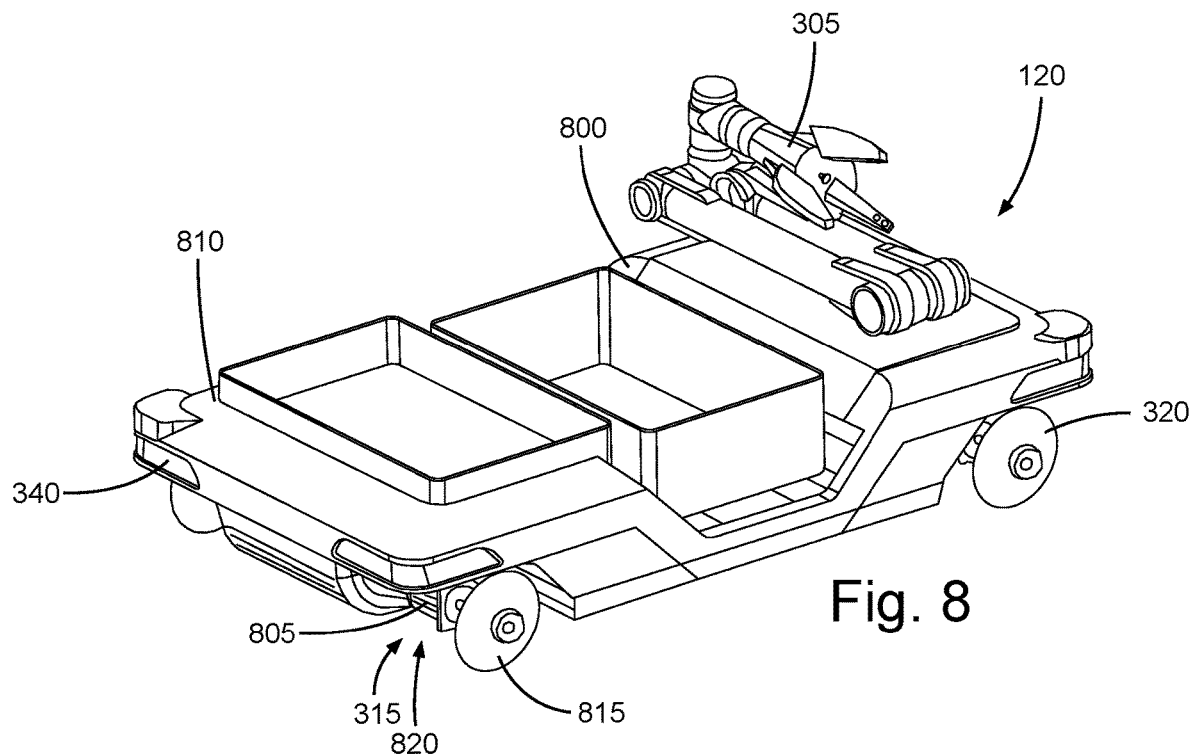
FIG. 8 is a perspective view of another example of a shuttle that is used in the FIG. 1 AMU system.

FIG. 8 shows a rear perspective view of another example of the AMU 120 in the form of a shuttle 800. As can be seen, in addition to the robot arm 305, the power train 315, the GNC system 320, and the sensor 340, the shuttle 800 in FIG. 8 includes the other components depicted in FIG. 3. The shuttle 800 includes a chassis 805 and a body 810 mounted to the chassis 805. Portions of the power train 315 and/or the GNC system 320 are incorporated into one or more wheel assemblies 815. The wheel assemblies 815 are turnably mounted to the chassis 805 such that the wheel assemblies 815 are able to move and steer the shuttle 800. The wheel assemblies 815 in the shuttle 800 are designed to turn independently of one another when required to allow the shuttle 800 to turn or change the horizontal direction of the shuttle 800 when in the AMU frame 210. Since the space is typically tight within the storage rack system 110, the shuttle 800 is unable to usually make wide turns. To facilitate a zero turning radius turn within the AMU frame 210, the wheel assembly 815 on opposing sides are able to turn in opposite directions at least ninety degrees (90°) relative to the body 810 of the shuttle 800. The body 810 of the shuttle 800 has one or more wheel wells 820 that form notches at the corners of the shuttle 800 to allow this turning and allow the wheel assemblies 815 to move the shuttle 800 in a horizontal direction that is transverse or perpendicular to the original travel direction. When outside (or even inside) the storage rack system 110, the wheel assemblies 815 can turn in unison to steer the shuttle 800 when travelling on the floor or ground, for example. The robot arm 305 and the power supply 310 are likewise mounted to the chassis 805 along with the other internal components of the shuttle 800.

Figure 9:
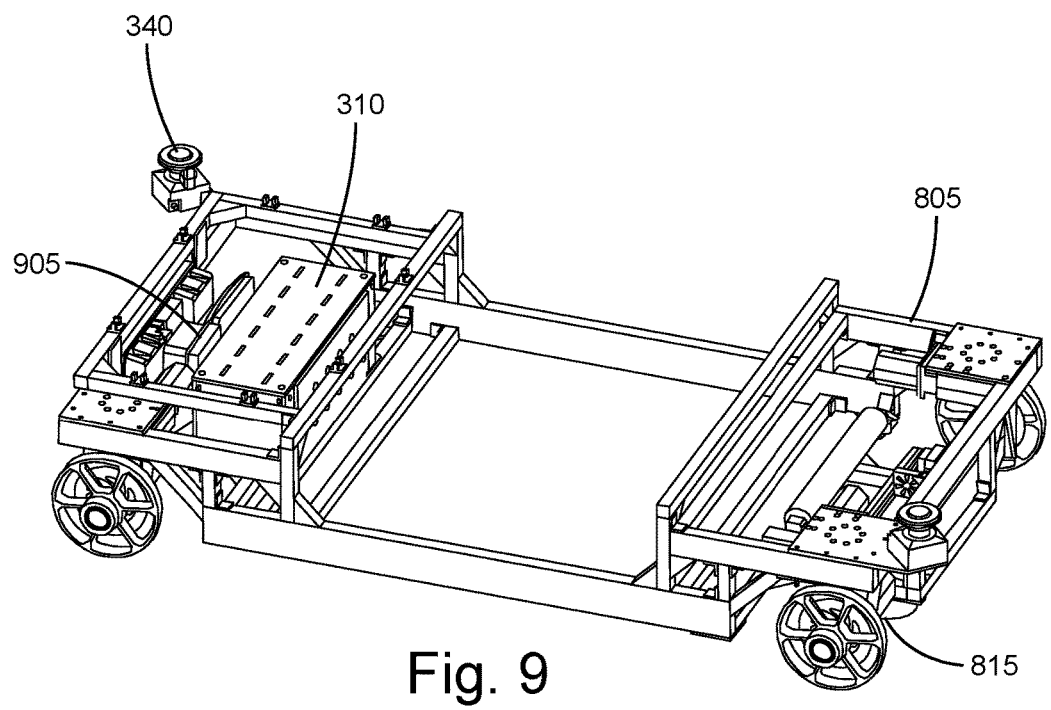
FIG. 9 is a perspective view of a chassis in the FIG. 8 shuttle.

FIG. 9 shows a top perspective view of the shuttle 800 with the body 810 and other selected components removed from the shuttle 800. As depicted, the power supply 310, sensor 340, and wheel assemblies 815 are mounted to the chassis 805. A shuttle controller 905 in the form of a computer that includes the processor 325 and memory 330 is also mounted to the chassis 805. The shuttle controller 905 controls the operation of the components of the shuttle 800.

Figure 10:
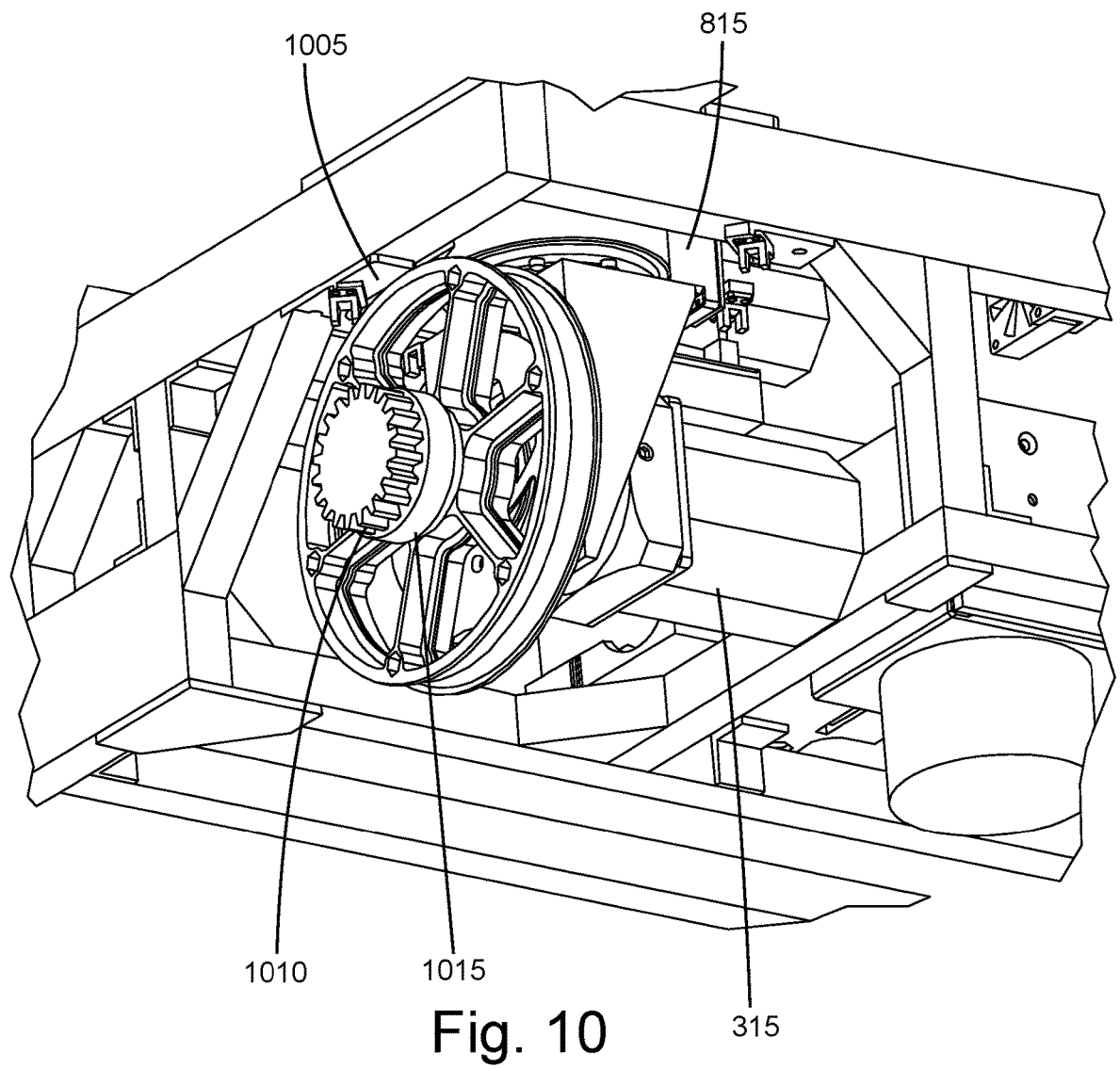
FIG. 10 is an enlarged perspective view of a wheel assembly in the FIG. 8 shuttle.

As noted before, the wheel assembly 815 incorporates portions of the axle 615 and gearbox 620. Portions of the axle 615 and gearbox 620 are incorporated into other components of the shuttle 800 such as in the mounting bracket 1105 and sensor 340. As shown in FIG. 10, the wheel assembly 815 includes a drive wheel 1005 that is configured to ride on the floor, ground, turn rails, and/or other objects that that allow the shuttle 800 to be self-supported. The drive wheel 1005 can be a solid component, include spokes, and/or incorporate other components such as tires. The tires in one example are made of insulative material, such as rubber, to electrically isolate the shuttle 800 when travelling on the ground. Facing exterior to the drive wheel 1005, the wheel assembly 815 has one or more cogwheels 1010. The cogwheels 1010 are designed to engage the track teeth 535 of the power rails 150. The cogwheels 1010 have cogwheel teeth 1015 that engage the track teeth 535 so as to provide traction as well as accurately control the position of the shuttle 800 when in the storage rack system 110. In one example, the drive wheel 1005 and cogwheels 1010 are able to be moved or rotated independently relative to one another. In another example, the drive wheel 1005 and cogwheels 1010 rotate in unison.

Figure 11:
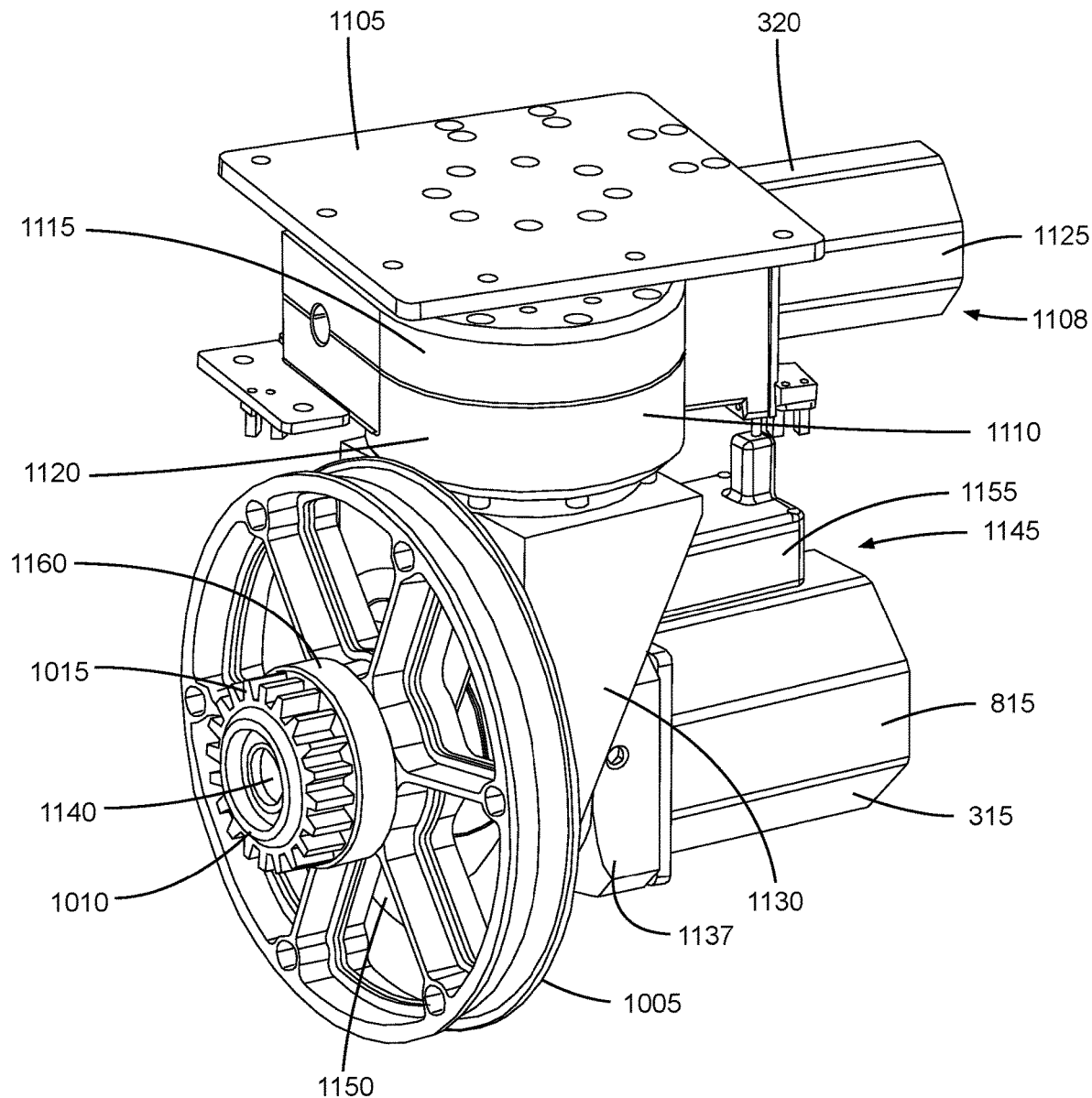
FIG. 11 is a perspective view of the FIG. 10 wheel assembly.
Figure 12:
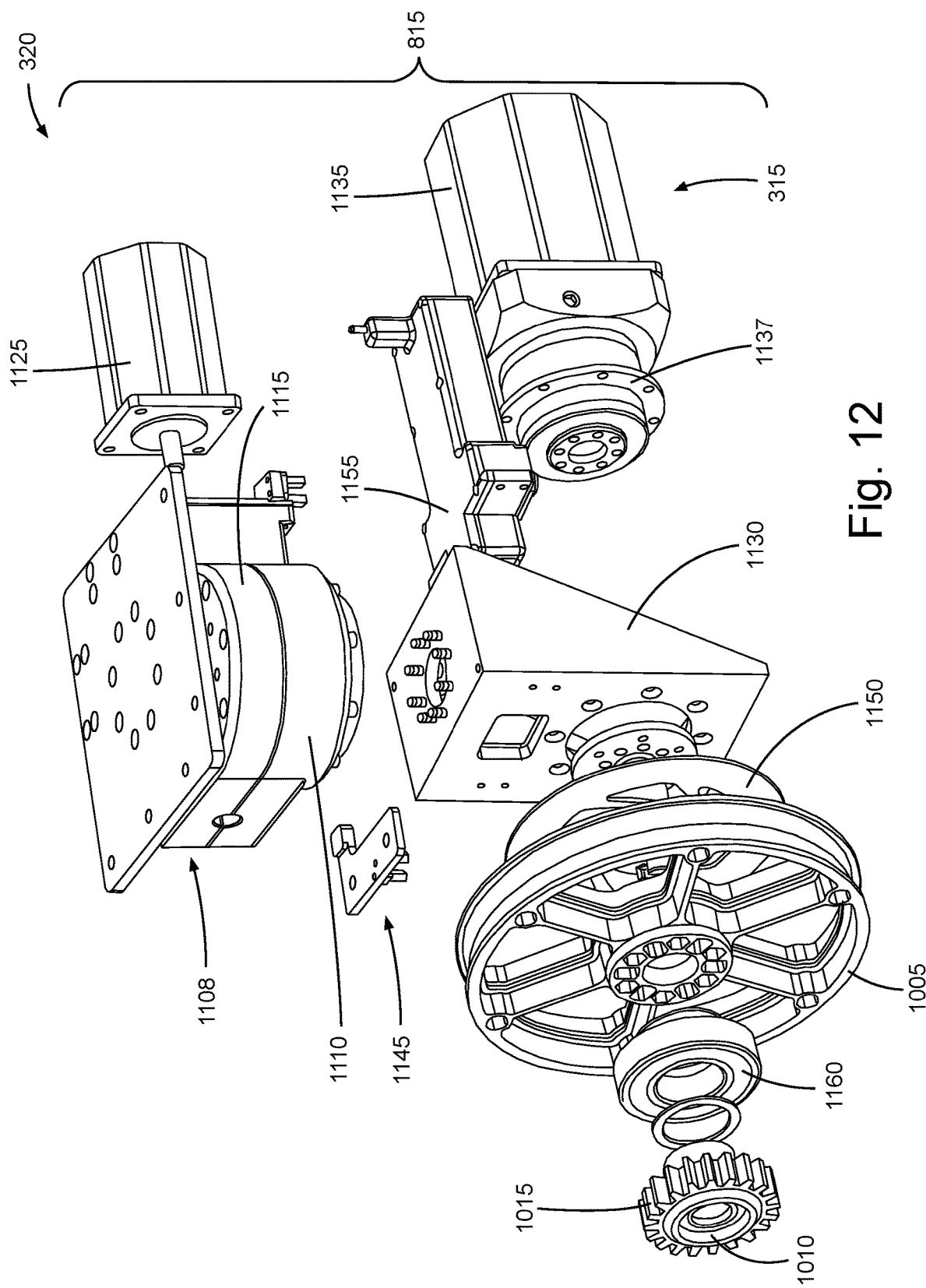
FIG. 12 is an exploded view of the FIG. 10 wheel assembly.

Looking at FIGS. 11 and 12, the wheel assembly 815 has a mounting bracket 1105 where the wheel assembly 815 is attached to the chassis 805. The wheel assembly 815 includes a steering system 1108 that is used to steer the drive wheel 1005 and cogwheels 1010. In the illustrated example, the steering system 1108 includes a steering collar 1110 with a fixed section 1115 secured to the mounting bracket 1105 and a rotating section 1120 that is able to rotate relative to the fixed section 1115. The steering system 1108 further includes a steering motor 1125 that is configured to rotate the rotating section 1120 relative to the fixed section 1115. In one form, bearings and lubricant are positioned between the fixed section 1115 and rotating section 1120 so as to reduce friction, but in other systems other mechanisms can be used to reduce friction. The steering motor 1125 in one variation is configured to rotate the rotating section 1120 of the steering collar 1110 through a rack and pinion type connection, but other types of connections can be used such as through a helical screw type thread type engagement between the steering motor 1125 and the rotating section 1120 of the steering collar 1110. The gearbox 620 of the mounting bracket 1105 controls the travel direction or steering of the shuttle 800 through the steering motor 1125. In one example, the steering motor 1125 includes a reversible electric motor, but other types of motors can be used in other examples. A wheel bracket 1130 is secured to the rotating section 1120 via fasteners. A drive motor 1135 with a gearbox 1137 which together forms part of the axle 615 is secured to the wheel bracket 1130. A drive shaft 1140 connects the drive wheel 1005 and cogwheels 1010 to the drive motor 1135. In one form, the drive motor 1135 includes a reversible electric motor so as to be able to rotate the drive wheel 1005 and cogwheels 1010 in opposite or different directions so as to change the velocity and/or direction of the shuttle 800. To control, slow down, and/or stop the shuttle 800, the wheel assembly 815 further includes a brake system 1145. As depicted, the brake system 1145 includes a brake disc 1150 that is engageable by a brake caliper system 1155. The brake system 1145 is able to hold the shuttle 800 at a fixed or steady location, such as when servicing one of the storage racks 205. Moreover, the brake system 1145 is able to quickly stop the shuttle 800 if needed. The illustrated example shows a disc brake type system, but in other variations, the shuttle 800 can include other types of brake systems 1145, such as drum type brakes or electromagnetic braking systems. As noted before, the wheel assembly 815 in one form is configured to allow the cogwheels 1010 to be rotated independently of the drive wheel 1005. In the illustrated example, the wheel assembly 815 includes a bearing 1160 to facilitate this relative movement. In another variation, the drive wheel 1005 and cogwheels 1010 rotate in unison. In other approaches, one or more of the drive wheel 1005 and/or cogwheels 1010 are unpowered and rotate freely. Of course, a combination of approaches can be used in further examples.

Depending on the desired electrical path in the wheel assembly 815, which will be described in further detail below with respect to FIGS. 13-16, all or part of the components of the wheel assembly 815 are at least in part made of conductive material like metal. For instance, all or part of the drive wheel 1005, cogwheel 1010, steering collar 1110, wheel bracket 1130, drive shaft 1140, and bearing 1160 in one example are made of one or more conductive metals.

Figure 13:
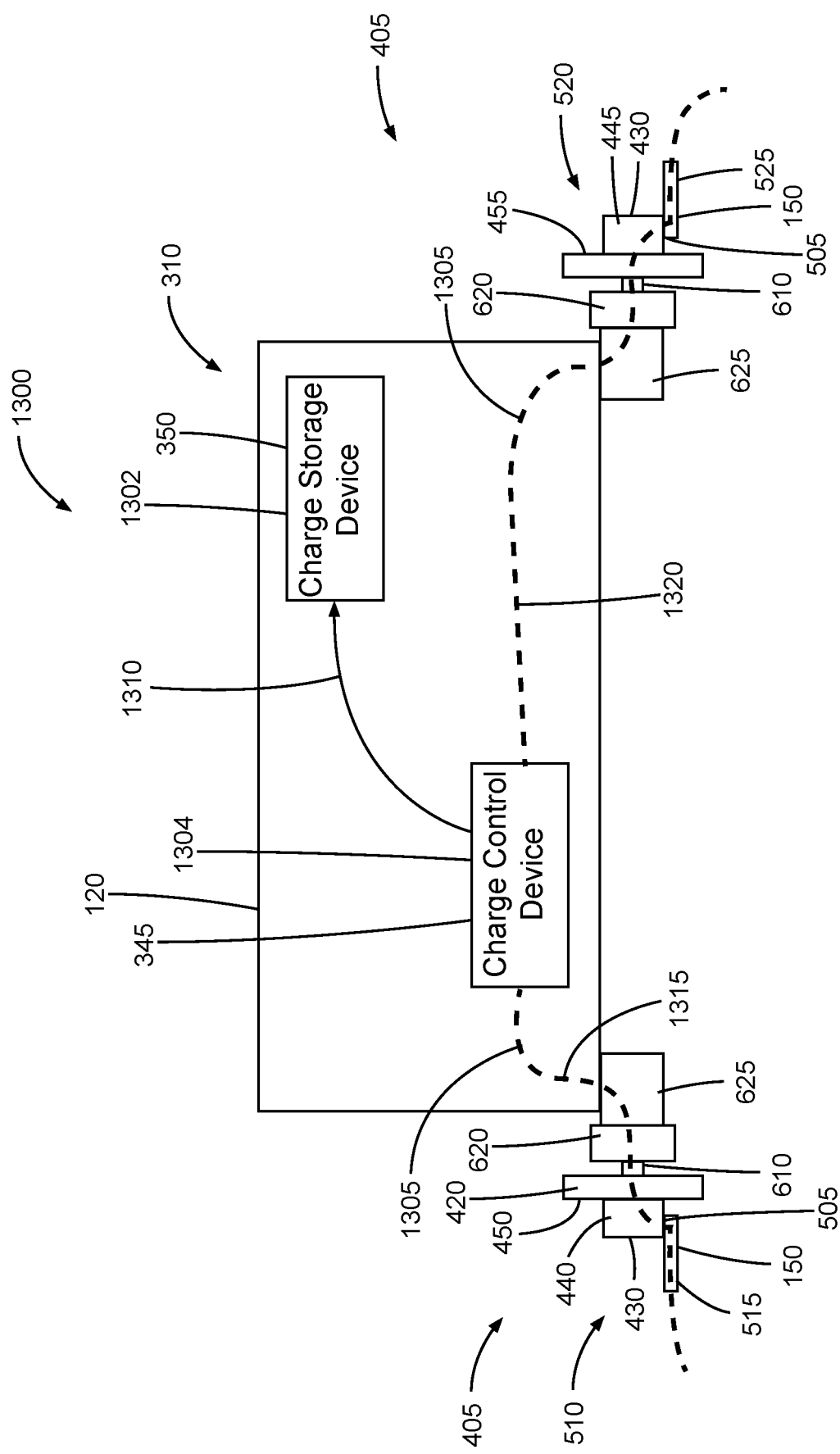
FIG. 13 is a diagrammatic view of a charging system for the FIG. 3 AMU and FIG. 8 shuttle according to one example.

A charging system 1300 for charging the ESS 350 in the power supply 310, such as a battery and/or capacitor, will now be described with reference to FIG. 13. FIG. 13 is a block diagram showing the AMU 120 in connection with the first charge cog track 515 and the second charge cog track 525. As shown, the charging system 1300 includes the ESS 350 in the form of a charge storage device 1302, such as a battery, and the power converter 345 in the form of a charge control device 1304 that controls the amount of electrical power supplied to the ESS 350 for recharging purposes. In the illustrated example, the power rails 150 are electrically powered to form a circuit in order to charge the ESS 350. In one form, DC is applied between the power rails 150, and in another example, AC is provided between the power rails 150. An electrical connection flow path 1305 between the power rails 150 is indicated by a dashed line in FIG. 13, and the power converter 345 is electrically connected to the ESS 350 through an electrical connection 1310 such as a power cable. The electrical connection flow path 1305 includes a first electrical connection path 1315 and a second electrical connection path 1320 which is shown as well. The first charge cog track 515 is connected to the energy source 160 by a terminal. In one particular example, AC flows along the electrical connection flow path 1305, and the charge control device 1304 converts the AC to DC which is supplied to the charge storage device 1302. To supply AC power to the power train 315 as well as other components of the AMU 120, the charge control device 1304 converts the DC from the charge storage device 1302 to AC. For this example, the charge control device 1304 includes a combined inverter-rectifier that converts between AC and DC, and back. Alternatively or additionally, the charge control device 1304 can supply DC to components of the AMUs 120 that require DC. The rectifier and inverter can be separate components in other examples.

In this example, selected components of the wheel assemblies 405 are made of conductive material, like metal, to form at least part of the electrical connection flow path 1305. For example, at least parts of the hubs 422, cogwheels 430, bearings 605, shafts 610, axles 615, gearboxes 620, and motors 625 (FIGS. 4 and 6) are made of conductive material in the illustrated example. It should be recognized that selected parts of these components can also include insulative material.

Through physical contact at the first side 510, the first charge cog track 515 is electrically connected to the first charge cogwheel 440 of the first wheel assembly 450. In the example illustrated in FIG. 13, the first electrical connection path 1315 travels from the first charge cog track 515 into the first wheel assembly 450 through the first charge cogwheel 440. From the first charge cogwheel 440, the first electrical connection path 1315 travels through the bearing 605, axle 615, and hub 422 of the outer traction portion 420 (FIG. 6). The electrical current of the electrical connection flow path 1305 then flows through the shaft 610, gearbox 620, and motor 625. In one example, the first electrical connection path 1315 has an electrical wire that electrically connects the motor 625 to the charge control device 1304, and in other examples, the motor 625 and charge control device 1304 are electrically connected in other ways, such as through the chassis 805 (FIG. 8). For instance, the chassis 805 can act as a chassis ground that is in turn grounded through one of the wheel assemblies 405.

Again, current flows from the first charge cog track 515 to the first cogwheels 430, through the shaft 610, gearbox 620, and electric motor 630 of the first wheel assembly 450, to the power converter 345, thus creating the first electrical connection path 1315. A similar connection path (i.e., the second electrical connection path 1320) is also shown leading to the power rail 150 at the second side 520. Electricity along the second electrical connection path 1320 flows to the power converter 345 and continues to flow in the opposite manner through the motor 625, gearbox 620, hub 422, cogwheels 430 and to the opposing second wheel assembly 455. The electrical power provided by the electrical connection flow path 1305 is converted by the charge control device 1304 and supplied via the electrical connection 1310 to the charge storage device 1302. As such, when a voltage is applied across the power rails 150, power is applied and available to the charge control device 1304 and may be made available to add charge to the charge storage device 1302. Alternatively or additionally, the power from the power rails 150 can be used to directly power the electric motors 630.

It should be recognized that the electrical connection flow path 1305 can flow through different components in other examples.

Figure 14:
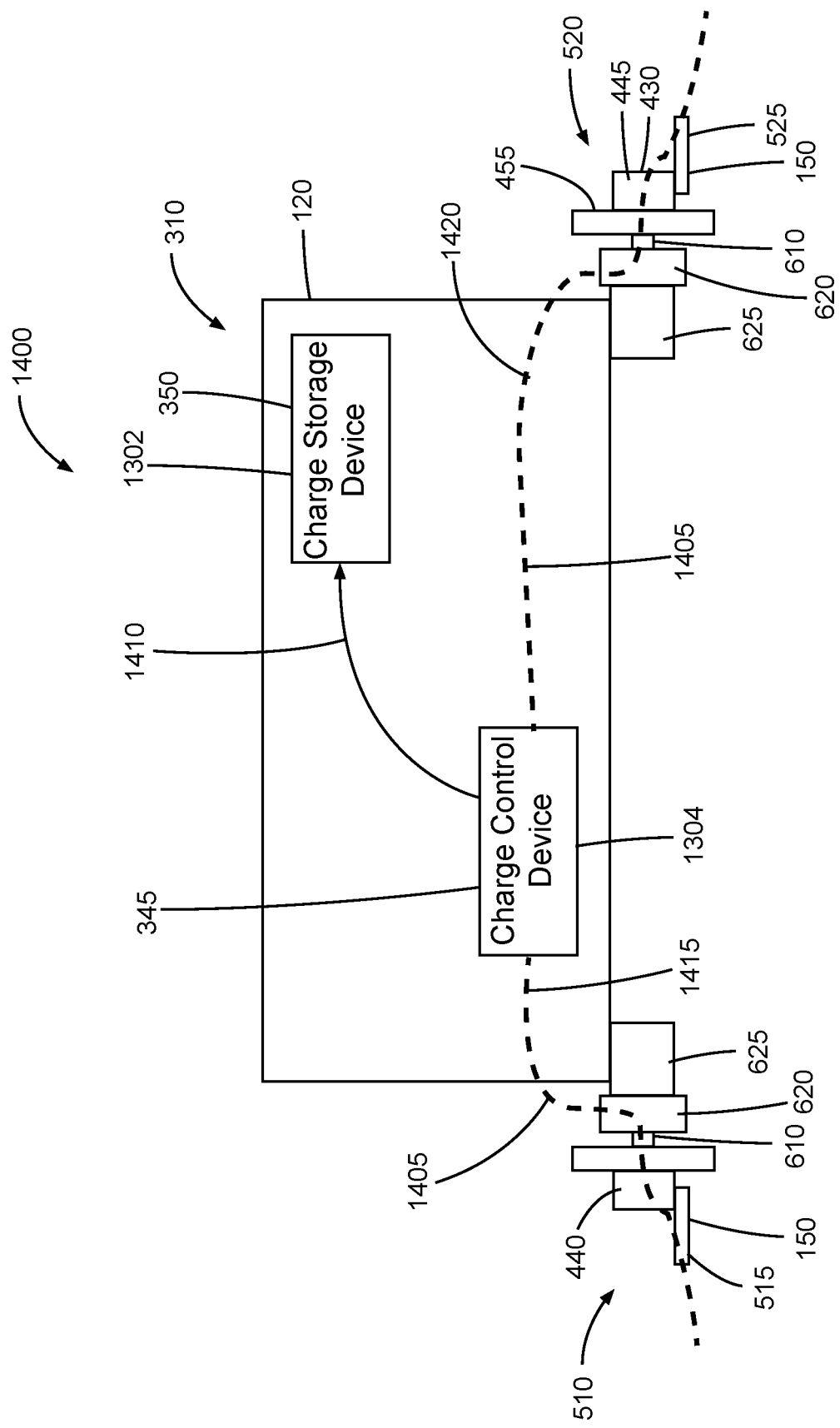
FIG. 14 is a diagrammatic view of a charging system for the FIG. 3 AMU and FIG. 8 shuttle according to another example.
Figure 15:
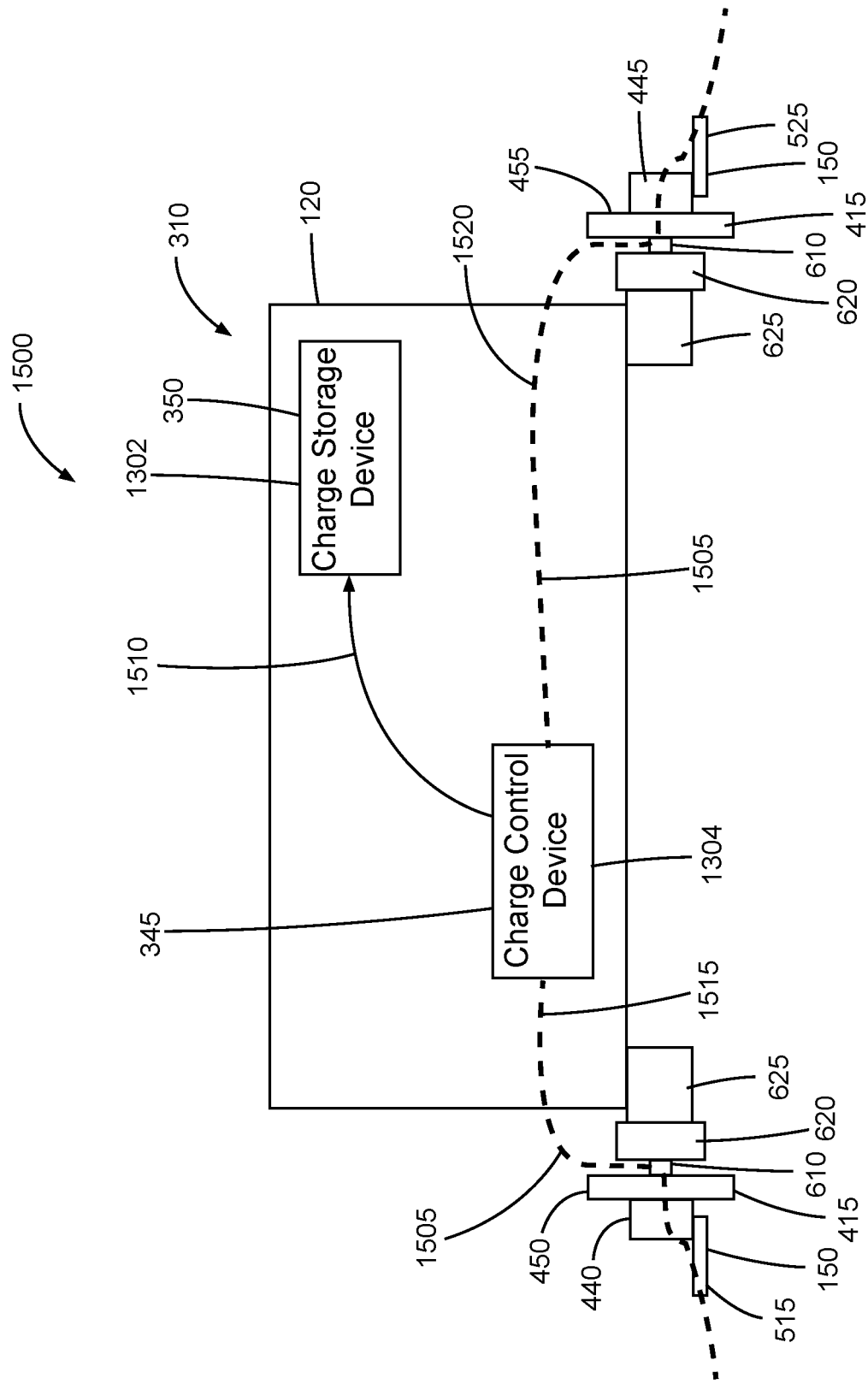
FIG. 15 is a diagrammatic view of a charging system for the FIG. 3 AMU and FIG. 8 shuttle according to a further example.
Figure 16:
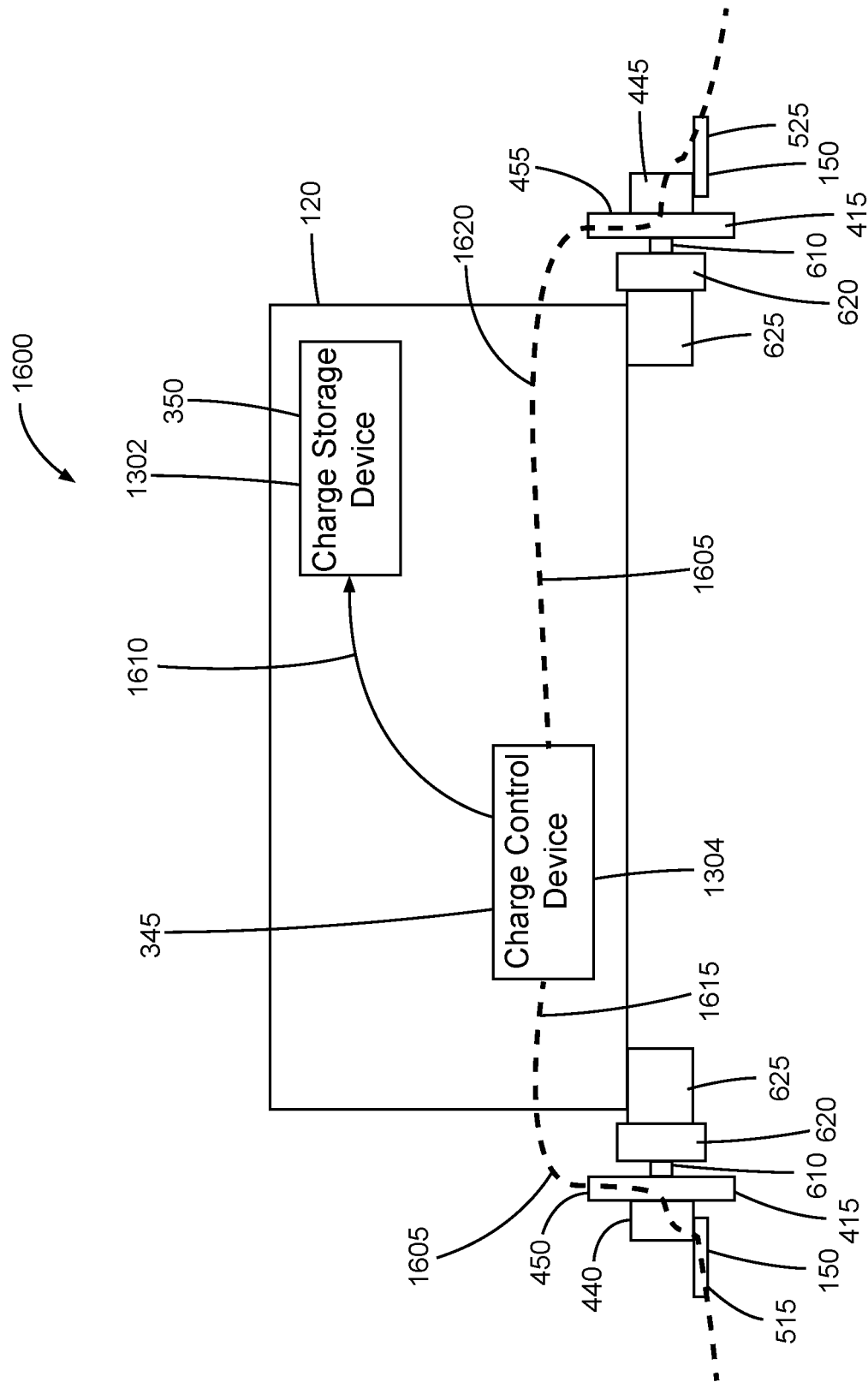
FIG. 16 is a diagrammatic view of a charging system for the FIG. 3 AMU and FIG. 8 shuttle according to still yet another example.

FIGS. 14, 15, and 16 each show the AMU 120 with electrical connection path variations. As shown, some components may not be needed as a conductor for an electrical connection path. In such cases, those components can be partially or fully made of insulative material.

A charging system 1400 for charging the ESS 350 in the power supply 310 will now be described with reference to FIG. 14. The charging system 1400 in FIG. 14 includes similar components to those described before. For the sake of clarity as well as brevity, these common features will not be again described in great detail, but please refer to the previous description of these common features. As can be seen, FIG. 14 is a block diagram showing the AMU 120 in connection with the first charge cog track 515 and the second charge cog track 525. As shown, the charging system 1400 includes the ESS 350 in the form of the charge storage device 1302 and the power converter 345 in the form of the charge control device 1304 that controls the amount of electrical power supplied to the ESS 350 for recharging purposes. In the illustrated example, the power rails 150 are electrically powered to form a circuit in order to charge the ESS 350. In one form, DC is applied between the power rails 150, and in another example, AC is provided between the power rails 150. An electrical connection flow path 1405 between the power rails 150 is indicated by a dashed line in FIG. 13, and the power converter 345 is electrically connected to the ESS 350 through an electrical connection 1410. The electrical connection flow path 1405 includes a first electrical connection path 1415 and a second electrical connection path 1420 which are shown as well. The first charge cog track 515 is connected to the energy source 160 by a terminal. In one particular example, AC flows along the electrical connection flow path 1405, and the charge control device 1304 converts the AC to DC which is supplied to the charge storage device 1302. To supply AC power to the power train 315 as well as other components of the AMUs 120, the charge control device 1304 converts the DC from the charge storage device 1302 to AC. For this example, the charge control device 1304 includes a combined inverter-rectifier that converts between AC and DC, and back. Alternatively or additionally, the charge control device 1304 can supply DC to components of the AMUs 120 that require DC.

In this example, selected components of the wheel assemblies 405 are made of conductive material, like metal, to form at least part of the electrical connection flow path 1405. For example, at least parts of the hubs 422, cogwheels 430, bearings 605, shafts 610, axles 615, and gearboxes 620 (FIGS. 4 and 6) are made of conductive material in the illustrated example. It should be recognized that selected parts of these components can also include insulative material. The motors 625 in one form are made at least in part of insulative material so as to prevent electrical current flowing across the motor 625.

FIG. 14 shows the first electrical connection path 1415 flows from the first charge cog track 515 to the first wheel assembly 450, through the shaft 610 and gearbox 620 for the first wheel assembly 450, to the charge control device 1304, without passing through the motor 625 of the first wheel assembly 450. In a similar fashion, the second electrical connection path 1420 flows through the gearbox 620 and shaft 610 without passing through the motor 625 of the second wheel assembly 455. From the shaft 610, the second electrical connection path 1420 flows between the second charge cogwheel 445 and the second charge cog track 525. In one example, the gearboxes 620 are electrically connected to the charge control device 1304 through an electrically conductive wire, but it should be recognized these components can be electrically connected in other ways.

Connections between parts may be made with conductive material (e.g., copper wire). Additionally, connection between parts moving relative to each other may be made with slip rings, bushings, bearings, or brushes, among other connection mechanisms, as would be know to one of ordinary skill in the art. Further, conductive jelly, conductive paste, or conductive grease may be used between connection mechanisms to protect materials from wear while maintaining an electrical connection. Insulative materials can be placed in between components to prevent current flow such as between the gearbox 620 and motor 625 in the illustrated example.

A charging system 1500 for charging the ESS 350 in the power supply 310 will now be described with reference to FIG. 14. The charging system 1500 in FIG. 15 includes similar components to those described before. For the sake of clarity as well as brevity, these common features will not be again described in great detail, but please refer to the previous description of these common features. As can be seen, FIG. 15 is a block diagram showing the AMU 120 in connection with the first charge cog track 515 and the second charge cog track 525. As shown, the charging system 1500 includes the ESS 350 in the form of the charge storage device 1302 and the power converter 345 in the form of the charge control device 1304 that controls the amount of electrical power supplied to the ESS 350 for recharging purposes. In the illustrated example, the power rails 150 are electrically powered to form a circuit in order to charge the ESS 350. In one form, DC is applied between the power rails 150, and in another example, AC is provided between the power rails 150. An electrical connection flow path 1505 between the power rails 150 is indicated by a dashed line in FIG. 15, and the power converter 345 is electrically connected to the ESS 350 through an electrical connection 1510. The electrical connection flow path 1505 includes a first electrical connection path 1515 and a second electrical connection path 1520 which is shown as well. The first charge cog track 515 is connected to the energy source 160 by a terminal. In one particular example, AC flows along the electrical connection flow path 1505, and the charge control device 1304 converts the AC to DC which is supplied to the charge storage device 1302. To supply AC power to the power train 315 as well as other components of the AMUs 120, the charge control device 1304 converts the DC from the charge storage device 1302 to AC. For this example, the charge control device 1304 includes a combined inverter-rectifier that converts between AC and DC, and back. Alternatively or additionally, the charge control device 1304 can supply DC to components of the AMUs 120 that require DC.

In this example, selected components of the wheel assemblies 405 are made of conductive material, like metal, to form at least part of the electrical connection flow path 1505. For example, at least parts of the hubs 422, cogwheels 430, bearings 605, and shafts 610 (FIGS. 4 and 6) are made of conductive material in the illustrated example. The axles 615, gearboxes 620, and motors 625 in one form are made at least in part of insulative material so as to prevent electrical current flowing across them. In other variations, only selected parts of these components include insulative material to prevent current flow.

FIG. 15 shows the first electrical connection path 1515 flows from the first charge cog track 515 to the first wheel assembly 450, through the shaft 610, to the charge control device 1304, without passing through the gearbox 620 and motor 625 of the first wheel assembly 450. In a similar fashion, the second electrical connection path 1520 flows through the shaft 610 without passing through the gearbox 620 and motor 625 of the second wheel assembly 455. From the shaft 610, the second electrical connection path 1520 flows between the second charge cogwheel 445 and the second charge cog track 525. In one example, the shafts 610 are electrically connected to the charge control device 1304 through an electrically conductive wire, but it should be recognized these components can be electrically connected in other ways.

Connection between parts moving relative to each other may be made with slip rings, bushings, bearings, or brushes, among other connection mechanisms, as would be known to one of ordinary skill in the art. Further, conductive jelly, conductive paste, or conductive grease may be used between connection mechanisms to protect materials from wear while maintaining an electrical connection. Insulative materials can be placed in between components to prevent current flow such as between the shaft 610 and gearbox 620 in the illustrated example.

A charging system 1600 for charging the ESS 350 in the power supply 310 will now be described with reference to FIG. 16. The charging system 1600 in FIG. 16 includes similar components to those described before. For the sake of clarity as well as brevity, these common features will not be again described in great detail, but please refer to the previous description of these common features. As can be seen, FIG. 16 is a block diagram showing the AMU 120 in connection with the first charge cog track 515 and the second charge cog track 525. As shown, the charging system 1600 includes the ESS 350 in the form of the charge storage device 1302 and the power converter 345 in the form of the charge control device 1304 that controls the amount of electrical power supplied to the ESS 350 for recharging purposes. In the illustrated example, the power rails 150 are electrically powered to form a circuit in order to charge the ESS 350. In one form, DC is applied between the power rails 150, and in another example, AC is provided between the power rails 150. An electrical connection flow path 1605 between the power rails 150 is indicated by a dashed line in FIG. 13, and the power converter 345 is electrically connected to the ESS 350 through an electrical connection 1610. The electrical connection flow path 1605 includes a first electrical connection path 1615 and a second electrical connection path 1620 which are shown as well. The first charge cog track 515 is connected to the energy source 160 by a terminal. In one particular example, AC flows along the electrical connection flow path 1605, and the charge control device 1304 converts the AC to DC which is supplied to the charge storage device 1302. To supply AC power to the power train 315 as well as other components of the AMUs 120, the charge control device 1304 converts the DC from the charge storage device 1302 to AC. For this example, the charge control device 1304 includes a combined inverter-rectifier that converts between AC and DC, and back. Alternatively or additionally, the charge control device 1304 can supply DC to components of the AMUs 120 that require DC.

In this example, selected components of the wheel assemblies 405 are made of conductive material, like metal, to form at least part of the electrical connection flow path 1605. For example, at least parts of the hubs 422 and cogwheels 430 (FIG. 4) are made of conductive material in the illustrated example. The bearings 605, shafts 610, axles 615, gearboxes 620, and motors 625 in one form are made at least in part of insulative material so as to prevent electrical current flowing across them. In other variations, only selected parts of these components include insulative material to prevent current flow.

FIG. 16 shows the first electrical connection path 1615 from the first charge cog track 515 to the first cogwheels 430 to the power converter 345, without passing through the shaft 610, gearbox 620, and motor 625 of the first wheel assembly 450. In a similar fashion, the second electrical connection path 1620 flows through the shaft 610 without passing through the shaft 610, gearbox 620, and motor 625 of the second wheel assembly 455. From the shaft 610, the second electrical connection path 1620 flows between the second charge cogwheel 445 and the second charge cog track 525. In one example, the drive wheels 415 are electrically connected to the charge control device 1304 through an electrically conductive wire, but it should be recognized these components can be electrically connected in other ways.

Once more, connections between parts moving relative to each other may be made with slip rings, bushings, bearings, or brushes, among other connection mechanisms, as would be known to one of ordinary skill in the art. Further, conductive jelly, conductive paste, or conductive grease may be used between connection mechanisms to protect materials from wear while maintaining an electrical connection. Insulative materials can be placed in between components to prevent current flow such as between the drive wheel 415 and shaft 610 in the illustrated example.

While the charging system 1300, charging system 1400, charging system 1500, and charging system 1600 shown in FIGS. 13-16 were described with reference to the AMU 120 shown in FIGS. 4-7, the shuttle 800 depicted in FIGS. 8-12 can likewise incorporate these same charging systems. For instance, the steering collar 1110 and wheel bracket 1130 of the wheel assembly 815 in FIGS. 11 and 12 are at least in part made of conductive material to complete a portion of the circuit for charging the ESS 350. As noted before, the wheel assembly 815 steers the shuttle 800 when located outside of and within the storage rack system 110. Other variations are also contemplated.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Autonomous Mobile Unit Frame" or "AMU Frame" generally refers to a structure along where the AMU moves. In one non-limiting example, AMU frame allows the AMUs to move independently of one another. The AMU frame can extend vertically and/or horizontally to allow AMU movement in multiple directions (e.g., horizontally, vertically, diagonally, etc.) along the AMU frame. In one example, the AMU frame includes multiple vertical levels and lanes. Typically, but not always, the AMU frame is generally aligned with one or more racks to allow the AMU to service the racks. An AMU frame in certain examples includes one or more rails on which the AMU travels. The AMU frame can further include vertical elevator shafts for facilitating vertical movement of the AMU and one or more switches for guiding the direction of the AMU onto different rails. The AMU frame in one form includes multiple horizontal travel lanes where the AMU can travel horizontally along the ends of racks and/or between opposing racks. The travel lanes can further include intersections where the AMU is able to turn and travel in different horizontal and/or vertical directions. The AMU frame in further examples include rack access passages, entrance/exit travel lanes, doorways, or docks through which the AMUs are able to enter and/or exit the AMU frame and travel along a floor or other surface.

"Autonomous Mobile Unit System" or "AMU System" generally refers to a mechanism used to transport items via one or more AMUs that move along an AMU frame. The AMUs in the AMU system are able to at least move in two spatial directions (i.e., in a vertical direction and a horizontal direction) along the AMU frame. In another form, the AMU is able to move in all three spatial dimensions within the AMU frame. The AMU system can include an infeed AMU system that typically (but not always) supplies items to a buffering system. The AMU system can further include a discharge AMU system that typically (but not always) discharges items from the buffering system.

"Automated Guided Vehicle" (AGV) or "Autonomous Mobile Unit" (AMU) generally refers to a mobile robot that is able to automatically self-navigate between various locations. For example, AGVs are typically, but not always, able to automatically navigate by following markers, such as wires or magnets embedded in the floor, by using lasers, and/or by using one or more vision systems. AGVs are also typically, but not always, designed to automatically avoid collisions, such as with other AGVs, equipment, and personnel. AGVs are commonly, but not always, used in industrial applications to move materials around a manufacturing facility or warehouse.

"Chassis" generally refers to an internal frame and/or supporting structure that supports an external object, body, and/or housing of the vehicle and/or electronic device. In one form, the chassis can further provide protection for internal parts of the vehicle and/or electronic device. By way of non-limiting examples, a chassis can include the underpart of a vehicle, including the frame on which the body is mounted. In an electronic device, the chassis for example includes a frame and/or other internal supporting structure on which one or more circuit boards and/or other electronics are mounted.

"Cogwheel", "Cog", or "Pinion" generally refers to a relatively small gear in a gear drive train. The cogwheel usually include a series of teeth that engage corresponding teeth on a rack or other teethed structure. Typically, but not always, the smaller cogwheel engages or is engaged inside a larger gear or to a rack. When engaging a rack, rotational motion applied to the cogwheel causes the rack to move relative to the cogwheel, thereby translating the rotational motion of the cogwheel into linear motion. By way of non-limiting examples, the cogwheel can be incorporated into differential, rack-and-pinion, and clutch bell drive trains, to name just a few. The cogwheel can be oriented in a number of manners relative to the larger gear or rack. For instance, the cogwheel can be angled perpendicular to a crown gear in a differential type drive.

"Conductor" or "Conductive Material" generally refers to a material and/or object that allows the free flow of an electrical charge in one or more directions such that relatively significant electric currents will flow through the material under the influence of an electric field under normal operating conditions. By way of non-limiting examples, conductors include materials having low resistivity, such as most metals (e.g., copper, gold, aluminum, etc.), graphite, and conductive polymers.

"Controller" generally refers to a device, using mechanical, hydraulic, pneumatic electronic techniques, and/or a microprocessor or computer, which monitors and physically alters the operating conditions of a given dynamical system. In one nonlimiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Energy Source" generally refers to a device, structure, mechanism, and/or system that provides power for performing work. The energy supplied by the energy source can take many forms including electrical, chemical, electrochemical, nuclear, hydraulic, pneumatic, gravitational, kinetic, and/or potential energy forms. The energy source for instance can include ambient energy sources, such as solar panels, external energy sources, such as from electrical power transmission networks, and/or portable energy sources, such as batteries. The energy source can include an energy carrier containing energy that can be later converted to other forms, such as into mechanical, heat, electrical, and/or chemical forms. Energy carriers can for instance include springs, electrical batteries, capacitors, pressurized air, dammed water, hydrogen, petroleum, coal, wood, and/or natural gas, to name just a few.

"Energy Storage System" (ESS) or "Energy Storage Unit" generally refers to a device that captures energy produced at one time for use at a later time. The energy can be supplied to the ESS in one or more forms for example including radiation, chemical, gravitational potential, electrical potential, electricity, elevated temperature, latent heat, and kinetic types of energy. The ESS converts the energy from forms that are difficult to store to more conveniently and/or economically storable forms. By way of non-limiting examples, techniques for accumulating the energy in the ESS can include: mechanical capturing techniques, such as compressed air storage, flywheels, gravitational potential energy devices, springs, and hydraulic accumulators; electrical and/or electromagnetic capturing techniques, such as using capacitors, super capacitors, and superconducting magnetic energy storage coils; biological techniques, such as using glycogen, biofuel, and starch storage mediums; electrochemical capturing techniques, such as using flow batteries, rechargeable batteries, and ultra batteries; thermal capture techniques, such as using eutectic systems, molten salt storage, phase-change materials, and steam accumulators; and/or chemical capture techniques, such as using hydrated salts, hydrogen, and hydrogen peroxide. Common ESS examples include lithium-ion batteries and super capacitors.

"Guidance, Navigation, and Control (GNC) System" generally refers to a physical device, a virtual device, and/or a group of devices configured to control the movement of vehicles, such as automobiles, automated guided vehicles, ships, aircraft, drones, spacecraft, and/or other moving objects. GNC systems are typically configured to determine a desired path of travel or trajectory of the vehicle from the vehicle's current location to a designated target, as well as desired changes in velocity, rotation, and/or acceleration for following the path. The GNC system can include and/or communicate with sensors like compasses, GPS receivers, Loran-C, star trackers, inertial measurement units, altimeters, environmental sensors, and the like. At a given time, such as when the vehicle is travelling, the GNC system is configured to determine the location (in one, two, or three dimensions) and velocity of the vehicle. For example, the GNC system is able to calculate changes in position, velocity, attitude, and/or rotation rates of a moving vehicle required to follow a certain trajectory and/or attitude profile based on information about the state of motion of the vehicle. The GNC system is able to maintain or change movement of the vehicle by manipulating forces by way of vehicle actuators, such as steering mechanisms, thrusters, flaps, etc., to guide the vehicle while maintaining vehicle stability. GNC systems can be found in autonomous or semi-autonomous vehicles.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as Non-Volatile Read Access memory (NVRAM), flash memory, non-volatile Static RAM (nvSRAM), Ferroelectric RAM (FeRAM), Magnetoresistive RAM (MRAM), Phase-change memory (PRAM), Conductive-Bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, pneumatic piston, hydraulic piston, and/or an internal combustion engine.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include the application layer, transport layer, internet layer (including, e.g., IPv6), or link layer.

"Power Converter" generally refers to a device that changes one form of energy to another form. In electrical systems, power converters change electric energy from one form to another, such as converting alternating current (AC) to direct current (DC) (or vice-versa) and/or changing electrical voltage, current, frequency, and/or phase of the electricity. For DC to DC conversion, the power converter can include voltage regulators and/or linear regulators. The power converter can include an inverter to change DC to AC, and the power converter can include a rectifier to change AC to DC. For AC to AC conversion, the power converter can include a transformer, autotransformer, variable-frequency transformer, voltage converter, voltage regulator, and/or cycloconverter. These of course are just a few non-limiting examples. Power converters can also change other forms of energy, such as mechanical and/or chemical energy, to name just a few. For instance, the power converter can include a hydraulic pump that converts electrical energy to mechanical energy when the energy storage system is in the form of a hydraulic accumulator.

"Power Supply" generally refers to an electrical device that provides electrical power to an electrical load, such as electrical machines and/or electronics.

"Powertrain" or "Powerplant" generally refers to devices and/or systems used to transform stored energy into kinetic energy for propulsion purposes. The powertrain can include multiple power sources and can be used in non-wheel-based vehicles. By way of nonlimiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and final drive components (e.g., drive wheels, continuous tracks, propeller, thrusters, etc.).

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, Calif.

Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Robotic Arm" or "Robot Arm" generally refers to a type of mechanical arm, usually programmable, with similar functions to a human arm. Links of the robot arm are connected by joints allowing either rotational motion (such as in an articulated robot) or translational (linear) displacement. The robot arm can have multiple axes of movement. By way of nonlimiting examples, the robot arm can be a 4, 5, 6, or 7 axis robot arm. Of course, the robot arm can have more or less axes of movement or freedom. Typically, but not always, the end of the robot arm includes a manipulator that is called an "End of Arm Tool" (EoAT) for holding, manipulating, or otherwise interacting with the cargo items or other objects. The EoAT can be configured in many forms besides what is shown and described herein.

"Sensor" generally refers to an object whose purpose is to detect events and/or changes in the environment of the sensor, and then provide a corresponding output. Sensors include transducers that provide various types of output, such as electrical and/or optical signals. By way of nonlimiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Shuttle" generally refers to a type of AGV or AMU that is able to transport one or more items that are resting on and/or in the device. Each shuttle is capable to move independently of one another and is able to move in multiple directions (e.g., horizontally, vertically, diagonally, etc.) along a shuttle frame. In one example, the shuttle includes a power train that is configured to move the shuttle, a steering system to direct shuttle movement, a tote transfer mechanism with a lift mechanism, and a robotic arm configured to transfer items to and/or from the shuttle. The power train in one example includes wheels that are driven by an electric motor, but in other examples, the power train can be configured differently. For instance, the power train can include a hydraulic motor and/or a pneumatic motor.

"Steering System" generally refers to one or more devices and/or linkages that allow a vehicle to follow a desired course. By way of non-limiting examples, the steering system can include active, passive, rear wheel, front wheel, four-wheel, power, steer-by-wire, articulated, speed sensitive, differential, crab, hydraulic, rack and pinion, worm and sector, recirculating ball, Ackerman, and/or Bell-crank type systems, to name just a few.

"Stock Keeping Unit" (SKU) or "Item" generally refers to an individual article or thing. The SKU can come in any form and can be packaged or unpackaged. For instance, SKUs can be packaged in cases, cartons, bags, drums, containers, bottles, cans, pallets, and/or sacks, to name just a few examples. The SKU is not limited to a particular state of matter such that the item can normally have a solid, liquid, and/or gaseous form for example.

"Storage Rack" or "Rack" generally refers to a framework structure on which items and/or storage containers are arranged, housed, stored, deposited, and/or removed. The framework can include one or more tiered vertical levels formed by bars, shelves, conveyors, wires, and/or pegs on which the items and/or storage containers are supported. The framework can have different overall shapes. For instance, the framework can have a rectangular or box shape in one example, and in other examples, the framework can include an A-Frame type rack. The location of the levels and rows in the rack can be fixed and/or adjustable.

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
| --- | --- |
| 100 | AMU system |
| 110 | storage rack system |
| 120 | AMUs |
| 130 | control system |
| 140 | network |
| 150 | power rails |
| 160 | energy source |
| 205 | storage rack |
| 210 | AMU frame |
| 215 | storage rows |
| 220 | rack columns |
| 222 | rack end |
| 225 | rack levels |
| 230 | rack access passage |
| 305 | robot arm |
| 310 | power supply |
| 315 | power train |
| 320 | GNC system |
| 325 | processor |
| 330 | memory |
| 335 | communication system |
| 340 | sensor |
| 345 | power converter |
| 350 | ESS |
| 405 | wheel assembly |
| 410 | body |
| 415 | drive wheel |
| 420 | outer traction portion |
| 422 | hub |
| 425 | axis |
| 430 | cogwheels |

-continued

| Reference Numbers | |
|---|---|
| 432 | cogwheel teeth |
| 435 | charge cogwheel |
| 440 | first charge cogwheel |
| 445 | second charge cogwheel |
| 450 | first wheel assembly |
| 455 | second wheel assembly |
| 505 | charge cog tracks |
| 510 | first side |
| 515 | first charge cog track |
| 520 | second side |
| 525 | second charge cog track |
| 530 | electrical charge connection |
| 535 | track teeth |
| 605 | bearing |
| 610 | shaft |
| 615 | axle |
| 620 | gearbox |
| 625 | motor |
| 630 | electric motor |
| 800 | shuttle |
| 805 | chassis |
| 810 | body |
| 815 | wheel assembly |
| 820 | wheel well |
| 905 | shuttle controller |
| 1005 | drive wheel |
| 1010 | cogwheels |
| 1015 | cogwheel teeth |
| 1105 | mounting bracket |
| 1108 | steering system |
| 1110 | steering collar |
| 1115 | fixed section |
| 1120 | rotating section |
| 1125 | steering motor |
| 1130 | wheel bracket |
| 1135 | drive motor |
| 1137 | gearbox |
| 1140 | drive shaft |
| 1145 | brake system |
| 1150 | brake disc |
| 1155 | brake caliper system |
| 1160 | bearing |
| 1300 | charging system |
| 1302 | charge storage device |
| 1304 | charge control device |
| 1305 | electrical connection flow path |
| 1310 | electrical connection |
| 1315 | first electrical connection path |
| 1320 | second electrical connection path |
| 1400 | charging system |
| 1405 | electrical connection flow path |
| 1410 | electrical connection |
| 1415 | first electrical connection path |
| 1420 | second electrical connection path |
| 1500 | charging system |
| 1505 | electrical connection flow path |
| 1510 | electrical connection |
| 1515 | first electrical connection path |
| 1520 | second electrical connection path |
| 1600 | charging system |
| 1605 | electrical connection flow path |
| 1610 | electrical connection |
| 1615 | first electrical connection path |
| 1620 | second electrical connection path |

What is claimed is:

1. A system, comprising:
a storage rack configured to store one or more items;
an Autonomous Mobile Unit (AMU) configured to move within the storage rack to service the items, where the AMU includes an Energy Storage System (ESS);
wherein the storage rack includes at least one power rail to charge the AMU within the storage rack;
wherein the AMU includes a wheel assembly with a cogwheel electrically connected to the power rail to charge the ESS; and
wherein the cogwheel is made of conductive material to electrically conduct electricity from the power rail to the ESS.

2. The system of claim 1, wherein the AMU includes a power supply electrically connected to the wheel assembly.

3. The system of claim 2, wherein the power supply includes a power converter electrically coupled to the Energy Storage System (ESS).

4. The system of claim 3, wherein the power converter includes a rectifier configured to convert Alternating Current (AC) to Direct Current (DC).

5. The system of claim 4, wherein the power converter includes an inverter configured to convert DC to AC.

6. The system of claim 5, wherein the ESS includes a battery.

7. The system of claim 2, wherein:
the power rail includes a cog track with track teeth; and
the cogwheel includes cogwheel teeth intermeshed with the track teeth.

8. The system of claim 7, wherein the wheel assembly includes a drive wheel configured to move the AMU outside of the storage rack.

9. The system of claim 8, wherein the drive wheel has a larger diameter than the cogwheel.

10. The system of claim 8, wherein the drive wheel electrically connects the cogwheel to the power supply.

11. The system of claim 10, wherein the wheel assembly includes a shaft that electrically connects the cogwheel to the power supply.

12. The system of claim 11, wherein the wheel assembly includes a gear box that electrically connects the cogwheel to the power supply.

13. The system of claim 12, wherein the wheel assembly includes a motor that electrically connects the cogwheel to the power supply.

14. The system of claim 8, wherein the wheel assembly includes a steering collar that electrically connects the cogwheel to the power supply.

15. The system of claim 1, wherein the AMU includes a shuttle that has a robotic arm.

16. A method, comprising:
servicing at least one item in a storage rack with an Autonomous Mobile Unit (AMU), wherein the AMU include a cogwheel electrically connected to a power supply of the AMU;
moving the AMU along at least one power rail located within the storage rack, wherein said moving includes engaging the cogwheel with the power rail to move the AMU; and
charging the AMU by flowing electrical current from the power rail, through the cogwheel, and to the power supply.

17. The method of claim 16, wherein:
the power rail includes a cog track with track teeth; and
said charging includes intermeshing cogwheel teeth of the cogwheel with the track teeth of the power rail.

18. The method of claim 16, further comprising:
wherein the AMU has a drive wheel that has a larger diameter than the cogwheel; and
moving the AMU outside of the storage rack with the drive wheel.

19. The method of claim 16, further comprising:
converting Alternating Current (AC) to Direct Current (DC) with a power converter of the power supply.

20. The method of claim 16, wherein said moving includes rotating the cogwheel with a motor that electrically connects the cogwheel to the power supply.

* * * * *